(12) United States Patent
Ozawa et al.

(10) Patent No.: US 8,312,374 B2
(45) Date of Patent: Nov. 13, 2012

(54) INFORMATION PROCESSING APPARATUS AND METHOD AND COMPUTER PROGRAM

(75) Inventors: Hiroyuki Ozawa, Tokyo (JP); Ryo Takaoka, Tokyo (JP); Nobuki Furue, Tokyo (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 12/508,909

(22) Filed: Jul. 24, 2009

(65) Prior Publication Data

US 2010/0053408 A1    Mar. 4, 2010

(30) Foreign Application Priority Data

Aug. 28, 2008   (JP) ................ 2008-219119

(51) Int. Cl.
*G06F 3/01* (2006.01)
*G06F 3/00* (2006.01)

(52) U.S. Cl. ........ 715/702; 715/769; 715/788; 715/838; 715/848; 715/850; 715/852; 345/157; 345/173

(58) Field of Classification Search .................. 715/838, 715/702, 769, 788, 848, 850, 852; 345/157, 345/173
See application file for complete search history.

(56) References Cited

U.S. PATENT DOCUMENTS

| | | | | |
|---|---|---|---|---|
| 5,485,565 A * | 1/1996 | Saund et al. | ........... | 345/442 |
| 5,745,116 A * | 4/1998 | Pisutha-Arnond | ........... | 715/863 |
| 5,754,179 A * | 5/1998 | Hocker et al. | ........... | 715/835 |
| 5,805,167 A * | 9/1998 | van Cruyningen | ........... | 715/808 |
| 5,847,708 A * | 12/1998 | Wolff | ........... | 715/764 |
| 5,875,446 A * | 2/1999 | Brown et al. | ........... | 1/1 |
| 5,912,668 A * | 6/1999 | Sciammarella et al. | ........... | 715/788 |
| 5,917,488 A * | 6/1999 | Anderson et al. | ........... | 715/838 |
| 5,920,313 A * | 7/1999 | Diedrichsen et al. | ........... | 715/767 |
| 5,966,122 A * | 10/1999 | Itoh | ........... | 715/838 |
| 6,069,606 A * | 5/2000 | Sciammarella et al. | ........... | 345/660 |
| 6,075,531 A * | 6/2000 | DeStefano | ........... | 715/788 |
| 6,097,387 A * | 8/2000 | Sciammarella et al. | ........... | 715/784 |
| 6,188,405 B1 * | 2/2001 | Czerwinski et al. | ........... | 715/764 |
| 6,239,803 B1 * | 5/2001 | Driskell | ........... | 715/810 |
| 6,249,316 B1 * | 6/2001 | Anderson | ........... | 348/333.05 |
| 6,253,218 B1 * | 6/2001 | Aoki et al. | ........... | 715/201 |
| 6,266,098 B1 * | 7/2001 | Cove et al. | ........... | 348/563 |
| 6,285,366 B1 * | 9/2001 | Ng et al. | ........... | 715/853 |
| 6,340,979 B1 * | 1/2002 | Beaton et al. | ........... | 715/764 |
| 6,523,048 B2 * | 2/2003 | DeStefano | ........... | 715/234 |
| 6,538,698 B1 * | 3/2003 | Anderson | ........... | 348/333.05 |

(Continued)

FOREIGN PATENT DOCUMENTS

EP    1 566 752 A2    8/2005

(Continued)

OTHER PUBLICATIONS

U.S. Appl. No. 12/479,269, filed Jun. 5, 2009, Ozawa, et al.

(Continued)

*Primary Examiner* — Steven B Theriault

(74) *Attorney, Agent, or Firm* — Oblon, Spivak, McClelland, Maier & Neustadt, L.L.P.

(57) ABSTRACT

An information processing apparatus includes: display means for displaying an image; operation-input receiving means for receiving operation input of a user; and display control means for performing, when the operation-input receiving means receives predetermined operation for a root image displayed on the display means, display control for causing the display means to display a related image related to the root image.

16 Claims, 22 Drawing Sheets

U.S. PATENT DOCUMENTS

| | | | | |
|---|---|---|---|---|
| 6,573,907 B1 * | | 6/2003 | Madrane | 715/719 |
| 6,580,437 B1 * | | 6/2003 | Liou et al. | 715/719 |
| 6,590,568 B1 * | | 7/2003 | Astala et al. | 345/173 |
| 6,629,104 B1 * | | 9/2003 | Parulski et al. | 382/307 |
| 6,646,652 B2 * | | 11/2003 | Card et al. | 345/645 |
| 6,654,035 B1 * | | 11/2003 | DeStefano | 715/798 |
| 6,700,612 B1 * | | 3/2004 | Anderson et al. | 348/333.11 |
| 6,728,752 B1 * | | 4/2004 | Chen et al. | 709/203 |
| 6,883,145 B2 * | | 4/2005 | Jaeger | 715/767 |
| 6,915,489 B2 * | | 7/2005 | Gargi | 715/790 |
| 6,918,091 B2 * | | 7/2005 | Leavitt et al. | 715/765 |
| 6,928,436 B2 * | | 8/2005 | Baudel | 1/1 |
| 6,943,842 B2 * | | 9/2005 | Stavely et al. | 348/333.05 |
| 6,948,123 B2 * | | 9/2005 | Endou et al. | 715/700 |
| 6,976,229 B1 * | | 12/2005 | Balabanovic et al. | 715/838 |
| 6,993,626 B2 * | | 1/2006 | Agata et al. | 711/115 |
| 7,003,737 B2 * | | 2/2006 | Chiu et al. | 715/848 |
| 7,055,110 B2 * | | 5/2006 | Kupka | 715/863 |
| 7,065,710 B2 * | | 6/2006 | Hayashi et al. | 715/732 |
| 7,117,453 B2 * | | 10/2006 | Drucker et al. | 715/833 |
| 7,134,092 B2 * | | 11/2006 | Fung et al. | 715/779 |
| 7,139,006 B2 * | | 11/2006 | Wittenburg et al. | 345/679 |
| 7,164,410 B2 * | | 1/2007 | Kupka | 345/156 |
| 7,240,300 B2 * | | 7/2007 | Jaeger | 715/863 |
| 7,265,786 B2 * | | 9/2007 | Venturino et al. | 348/333.02 |
| 7,292,243 B1 * | | 11/2007 | Burke | 345/440 |
| 7,325,198 B2 * | | 1/2008 | Adcock et al. | 715/722 |
| 7,327,347 B2 * | | 2/2008 | Hilbert et al. | 345/156 |
| 7,336,279 B1 * | | 2/2008 | Takiguchi | 345/473 |
| 7,340,678 B2 * | | 3/2008 | Chiu et al. | 715/734 |
| 7,366,995 B2 * | | 4/2008 | Montague | 715/798 |
| 7,383,503 B2 * | | 6/2008 | Banks | 715/273 |
| 7,437,005 B2 * | | 10/2008 | Drucker et al. | 382/224 |
| 7,446,784 B2 * | | 11/2008 | Crew et al. | 345/679 |
| 7,451,407 B2 * | | 11/2008 | Brodie et al. | 715/828 |
| 7,454,717 B2 * | | 11/2008 | Hinckley et al. | 715/863 |
| 7,460,140 B2 * | | 12/2008 | Hayashi et al. | 345/698 |
| 7,511,695 B2 * | | 3/2009 | Furukawa et al. | 345/102 |
| 7,535,475 B2 * | | 5/2009 | Sorotokin et al. | 345/581 |
| 7,542,994 B2 * | | 6/2009 | Anderson | 1/1 |
| 7,543,248 B2 * | | 6/2009 | Denoue et al. | 715/863 |
| 7,548,936 B2 * | | 6/2009 | Liu et al. | 1/1 |
| 7,583,265 B2 * | | 9/2009 | Shiraishi et al. | 345/427 |
| 7,587,411 B2 * | | 9/2009 | De Vorchik et al. | 1/1 |
| 7,590,948 B2 * | | 9/2009 | Narita et al. | 715/810 |
| 7,593,602 B2 * | | 9/2009 | Stentiford | 382/305 |
| 7,603,628 B2 * | | 10/2009 | Park et al. | 715/764 |
| 7,603,633 B2 * | | 10/2009 | Zhao et al. | 715/863 |
| 7,614,016 B2 * | | 11/2009 | Wong et al. | 715/854 |
| 7,629,966 B2 * | | 12/2009 | Anson | 345/173 |
| 7,643,012 B2 * | | 1/2010 | Kim et al. | 345/173 |
| 7,644,373 B2 * | | 1/2010 | Jing et al. | 715/838 |
| 7,657,845 B2 * | | 2/2010 | Drucker et al. | 715/833 |
| 7,668,867 B2 * | | 2/2010 | Morris et al. | 707/705 |
| 7,675,514 B2 * | | 3/2010 | Ni et al. | 345/419 |
| 7,680,817 B2 * | | 3/2010 | Audet et al. | 707/999.102 |
| 7,710,423 B2 * | | 5/2010 | Drucker et al. | 345/474 |
| 7,716,604 B2 * | | 5/2010 | Kataoka et al. | 715/835 |
| 7,721,226 B2 * | | 5/2010 | Barabe et al. | 715/810 |
| 7,725,837 B2 * | | 5/2010 | Wong et al. | 715/815 |
| 7,747,968 B2 * | | 6/2010 | Brodersen et al. | 715/821 |
| 7,788,592 B2 * | | 8/2010 | Williams et al. | 715/764 |
| 7,792,868 B2 * | | 9/2010 | Finkelstein et al. | 707/798 |
| 7,797,641 B2 * | | 9/2010 | Karukka et al. | 715/802 |
| 7,818,688 B2 * | | 10/2010 | Narita et al. | 715/841 |
| 7,818,689 B2 * | | 10/2010 | Wada | 715/853 |
| 7,825,939 B2 * | | 11/2010 | Mukunashi | 345/619 |
| 7,836,050 B2 * | | 11/2010 | Jing et al. | 707/728 |
| 7,840,912 B2 * | | 11/2010 | Elias et al. | 715/863 |
| 7,916,125 B2 * | | 3/2011 | Shin et al. | 345/173 |
| 7,917,865 B2 * | | 3/2011 | Saijo et al. | 715/784 |
| 7,936,380 B2 * | | 5/2011 | Takayama | 348/231.2 |
| 7,954,065 B2 * | | 5/2011 | Ubillos | 715/793 |
| 7,986,324 B2 * | | 7/2011 | Funaki et al. | 345/440 |
| 7,995,078 B2 * | | 8/2011 | Baar | 345/660 |
| 8,001,476 B2 * | | 8/2011 | Gallo | 715/742 |
| 8,005,927 B2 * | | 8/2011 | Apfel et al. | 709/219 |
| 8,028,249 B2 * | | 9/2011 | Loui et al. | 715/835 |
| 8,069,404 B2 * | | 11/2011 | Audet | 715/203 |
| 2002/0033837 A1 * | | 3/2002 | Munro | 345/654 |
| 2002/0118214 A1 * | | 8/2002 | Card et al. | 345/619 |
| 2003/0033296 A1 * | | 2/2003 | Rothmuller et al. | 707/3 |
| 2003/0101187 A1 * | | 5/2003 | Gaussier et al. | 707/100 |
| 2003/0208473 A1 * | | 11/2003 | Lennon | 707/3 |
| 2003/0210281 A1 * | | 11/2003 | Ellis et al. | 345/838 |
| 2003/0233460 A1 * | | 12/2003 | Drucker et al. | 709/228 |
| 2003/0234768 A1 * | | 12/2003 | Rekimoto et al. | 345/169 |
| 2004/0150657 A1 * | | 8/2004 | Wittenburg et al. | 345/619 |
| 2004/0175764 A1 * | | 9/2004 | Nishiyama et al. | 435/7.2 |
| 2004/0217947 A1 * | | 11/2004 | Fitzmaurice et al. | 345/183 |
| 2004/0252119 A1 * | | 12/2004 | Hunleth et al. | 345/440 |
| 2004/0257375 A1 * | | 12/2004 | Cowperthwaite | 345/582 |
| 2005/0076056 A1 * | | 4/2005 | Paalasmaa et al. | 707/104.1 |
| 2005/0091596 A1 * | | 4/2005 | Anthony et al. | 715/712 |
| 2005/0110768 A1 * | | 5/2005 | Marriott et al. | 345/173 |
| 2005/0131924 A1 * | | 6/2005 | Jones | 707/100 |
| 2005/0144567 A1 * | | 6/2005 | Kurtenbach et al. | 715/810 |
| 2005/0165795 A1 * | | 7/2005 | Myka et al. | 707/100 |
| 2005/0165841 A1 * | | 7/2005 | Kasperkiewicz et al. | 707/104.1 |
| 2005/0187943 A1 * | | 8/2005 | Finke-Anlauff et al. | 707/100 |
| 2005/0188326 A1 * | | 8/2005 | Ikeda | 715/788 |
| 2005/0210416 A1 * | | 9/2005 | MacLaurin et al. | 715/851 |
| 2006/0026535 A1 * | | 2/2006 | Hotelling et al. | 715/863 |
| 2006/0036568 A1 * | | 2/2006 | Moore et al. | 707/1 |
| 2006/0048076 A1 * | | 3/2006 | Vronay et al. | 715/850 |
| 2006/0085767 A1 * | | 4/2006 | Hinckley et al. | 715/863 |
| 2006/0161867 A1 * | | 7/2006 | Drucker et al. | 715/810 |
| 2006/0209014 A1 * | | 9/2006 | Duncan et al. | 345/156 |
| 2007/0008430 A1 * | | 1/2007 | Kim et al. | 348/565 |
| 2007/0020592 A1 * | | 1/2007 | Cornale | 434/169 |
| 2007/0055940 A1 * | | 3/2007 | Moore et al. | 715/738 |
| 2007/0067738 A1 * | | 3/2007 | Flynt et al. | 715/810 |
| 2007/0139402 A1 * | | 6/2007 | Chang | 345/204 |
| 2007/0216709 A1 * | | 9/2007 | Kojima et al. | 345/619 |
| 2008/0062141 A1 * | | 3/2008 | Chandhri | 345/173 |
| 2008/0118160 A1 * | | 5/2008 | Fan et al. | 382/225 |
| 2008/0134071 A1 * | | 6/2008 | Keohane et al. | 715/769 |
| 2008/0144107 A1 * | | 6/2008 | Lieb | 358/1.18 |
| 2008/0307303 A1 * | | 12/2008 | Louch et al. | 715/273 |
| 2009/0077501 A1 * | | 3/2009 | Partridge et al. | 715/846 |
| 2009/0119288 A1 * | | 5/2009 | Sagoo et al. | 707/5 |
| 2009/0150791 A1 * | | 6/2009 | Garcia | 715/738 |
| 2009/0153475 A1 * | | 6/2009 | Kerr et al. | 345/157 |
| 2009/0172532 A1 * | | 7/2009 | Chaudhri | 715/702 |
| 2009/0193359 A1 * | | 7/2009 | Anthony et al. | 715/804 |
| 2009/0198359 A1 * | | 8/2009 | Chaudhri | 700/94 |
| 2009/0265664 A1 * | | 10/2009 | Shin | 715/810 |
| 2009/0282369 A1 * | | 11/2009 | Jones | 715/848 |
| 2010/0007613 A1 * | | 1/2010 | Costa | 345/173 |
| 2010/0058228 A1 * | | 3/2010 | Park | 715/786 |
| 2010/0058238 A1 * | | 3/2010 | Ben Moshe | 715/818 |
| 2010/0107125 A1 * | | 4/2010 | Ockene et al. | 715/838 |
| 2010/0159966 A1 * | | 6/2010 | Friedman et al. | 455/466 |
| 2010/0162174 A1 * | | 6/2010 | Karidi et al. | 715/854 |
| 2010/0287513 A1 * | | 11/2010 | Singh et al. | 715/863 |
| 2011/0016150 A1 * | | 1/2011 | Engstrom et al. | 707/778 |
| 2011/0194761 A1 * | | 8/2011 | Wang et al. | 382/165 |
| 2011/0257896 A1 * | | 10/2011 | Dowds et al. | 702/20 |

FOREIGN PATENT DOCUMENTS

| EP | 1 566 752 A3 | 8/2005 |
| EP | 1 962 175 A1 | 8/2008 |
| JP | 2003-99171 | 4/2003 |
| JP | 2005-202952 | 7/2005 |
| JP | 2006-511859 | 4/2006 |
| JP | 2007-19685 | 1/2007 |
| JP | 2007-256310 | 10/2007 |
| JP | 2007-257199 | 10/2007 |
| KR | 2008-0078573 | 8/2008 |

OTHER PUBLICATIONS

U.S. Appl. No. 12/496,984, filed Jul. 2, 2009, Iwase, et al.
U.S. Appl. No. 12/499,349, filed Jul. 8, 2009, Ozawa, et al.

U.S. Appl. No. 12/509,045, filed Jul. 24, 2009, Iwase, et al.
U.S. Appl. No. 12/580,627, filed Oct. 16, 2009, Ozawa, et al.
U.S. Appl. No. 12/604,795, filed Oct. 23, 2009, Iwase, et al.
U.S. Appl. No. 12/607,475, filed Oct. 28, 2009, Ozawa, et al.
U.S. Appl. No. 12/559,163, filed Sep. 14, 2009, Ozawa, et al.

* cited by examiner

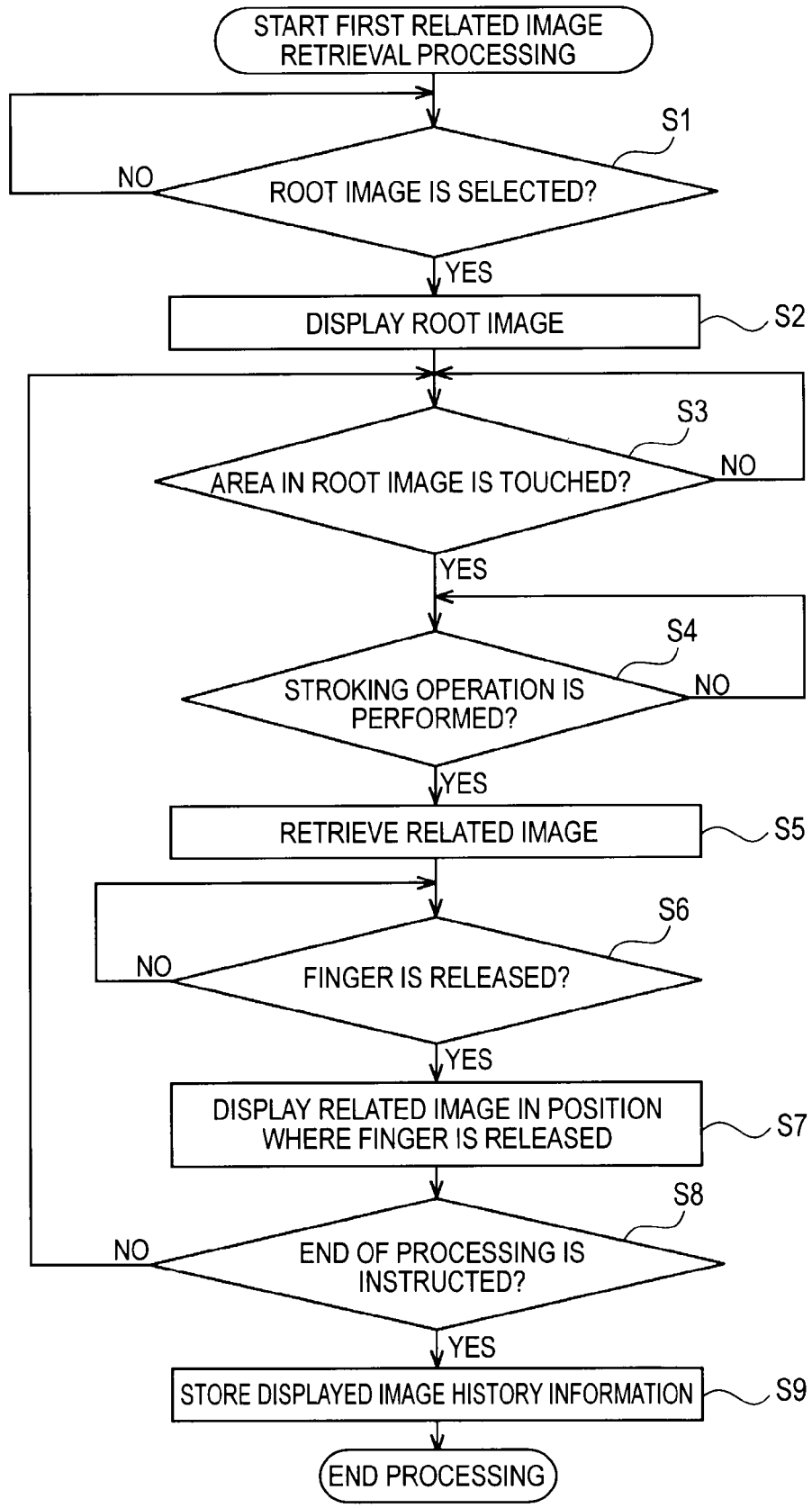

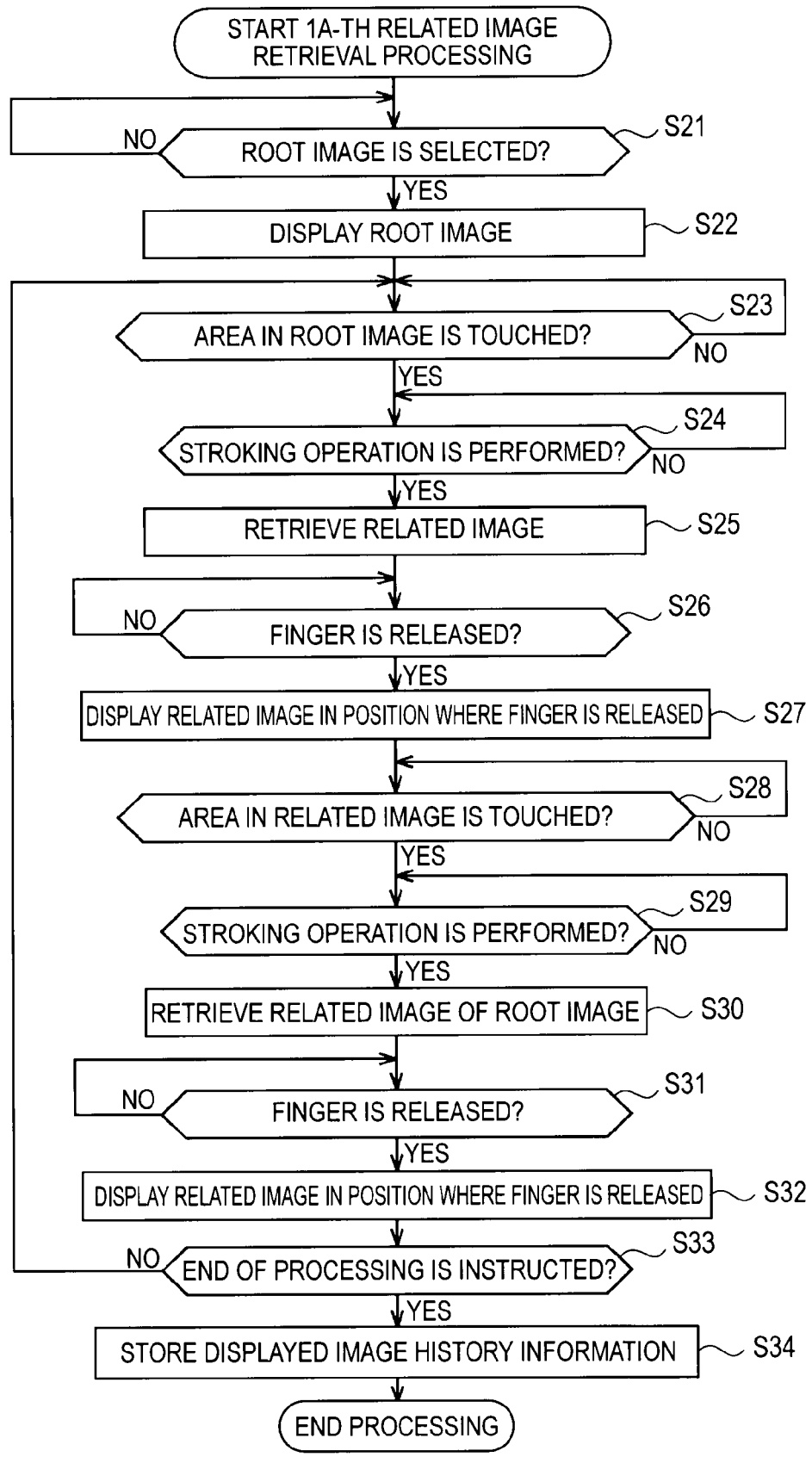

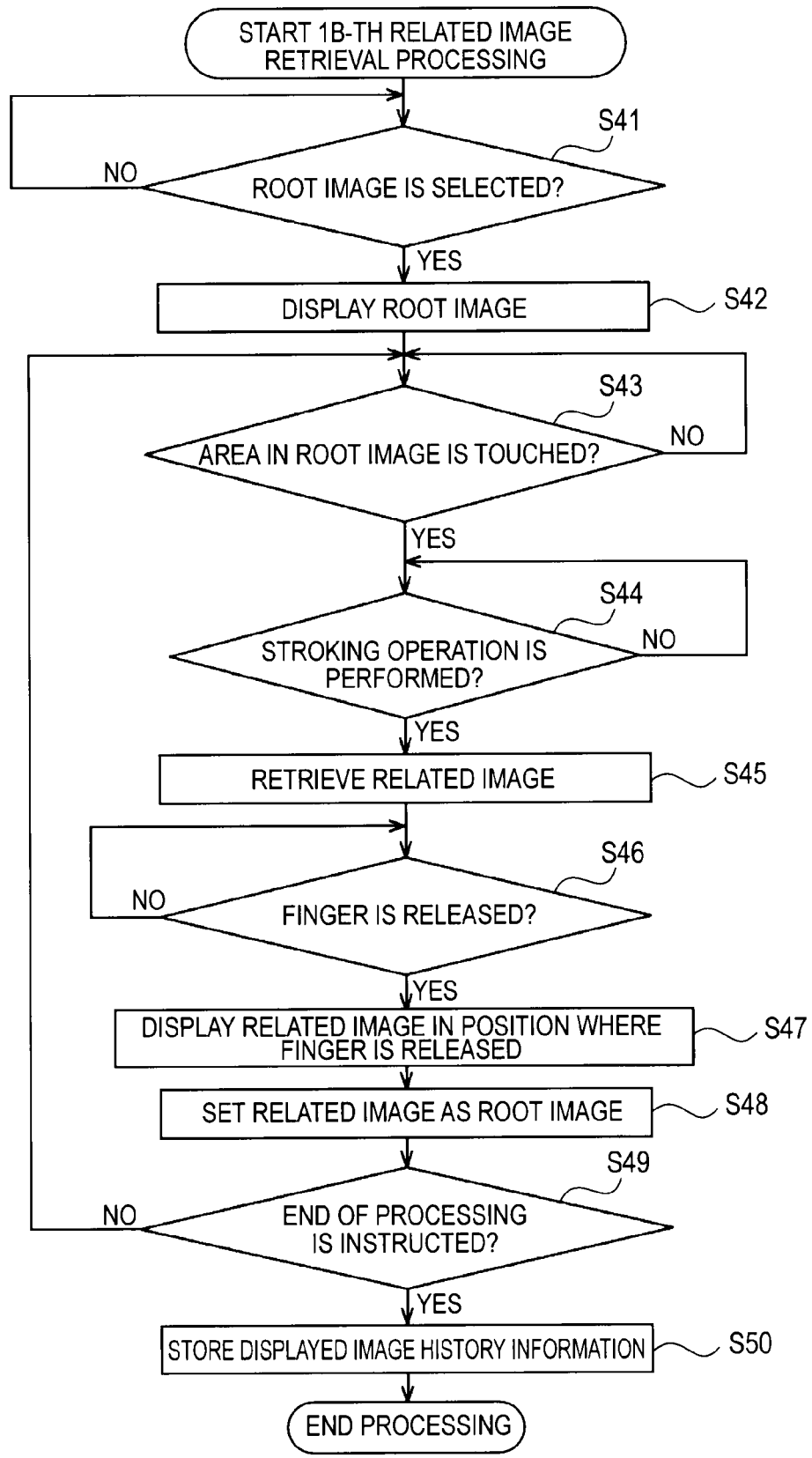

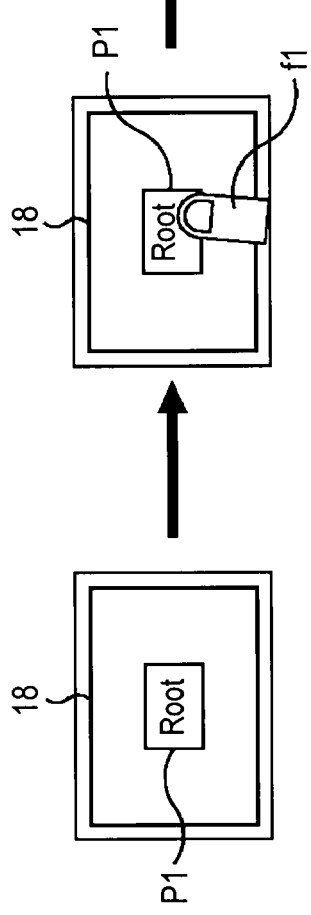
FIG.7A
FIG.7B
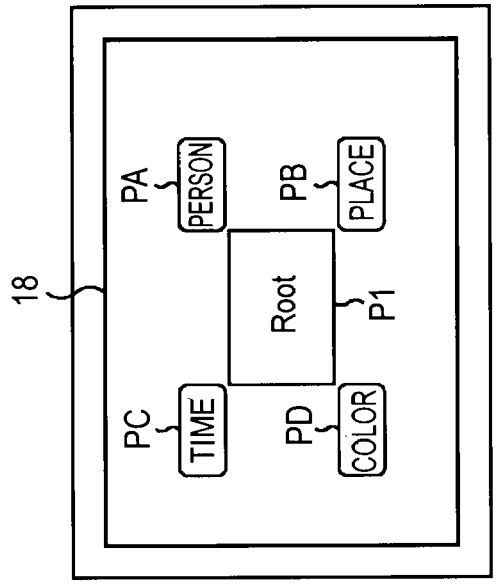
FIG.7C
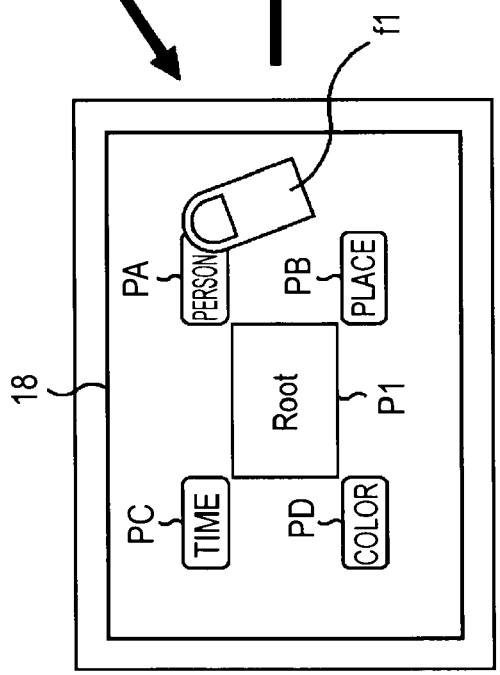
FIG.7D
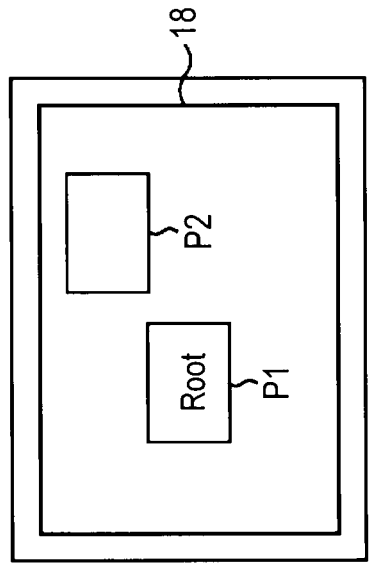
FIG.7E

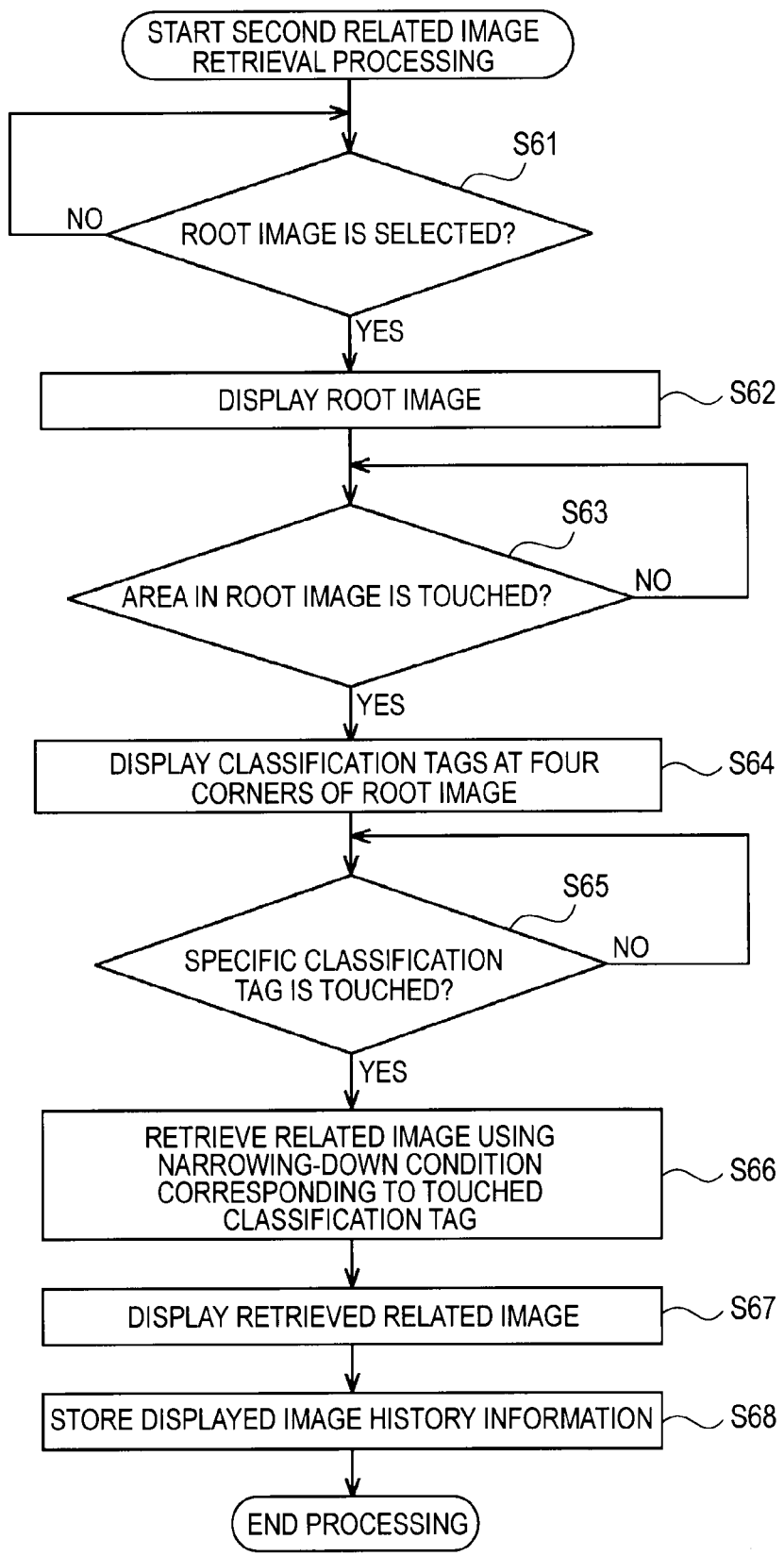

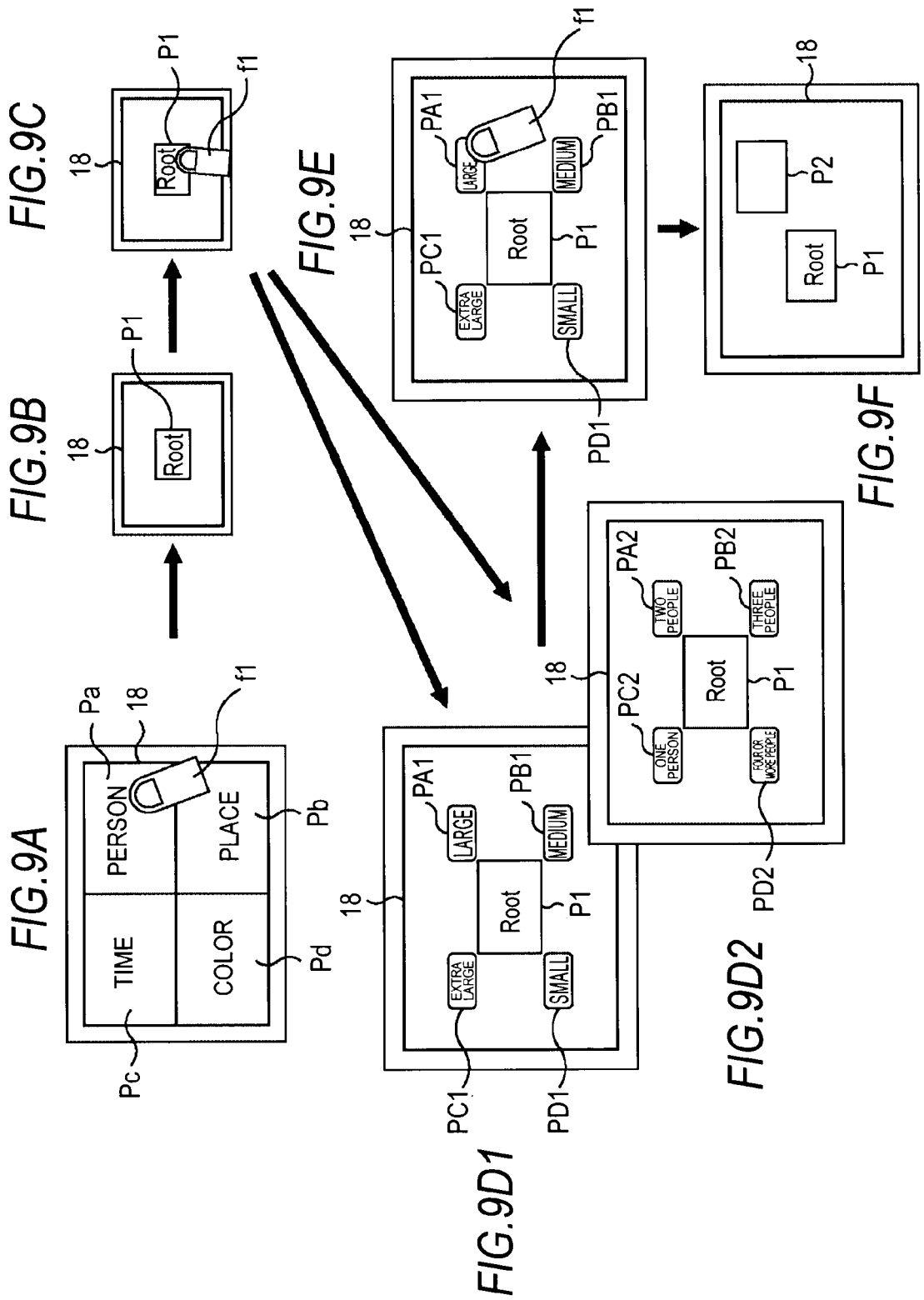

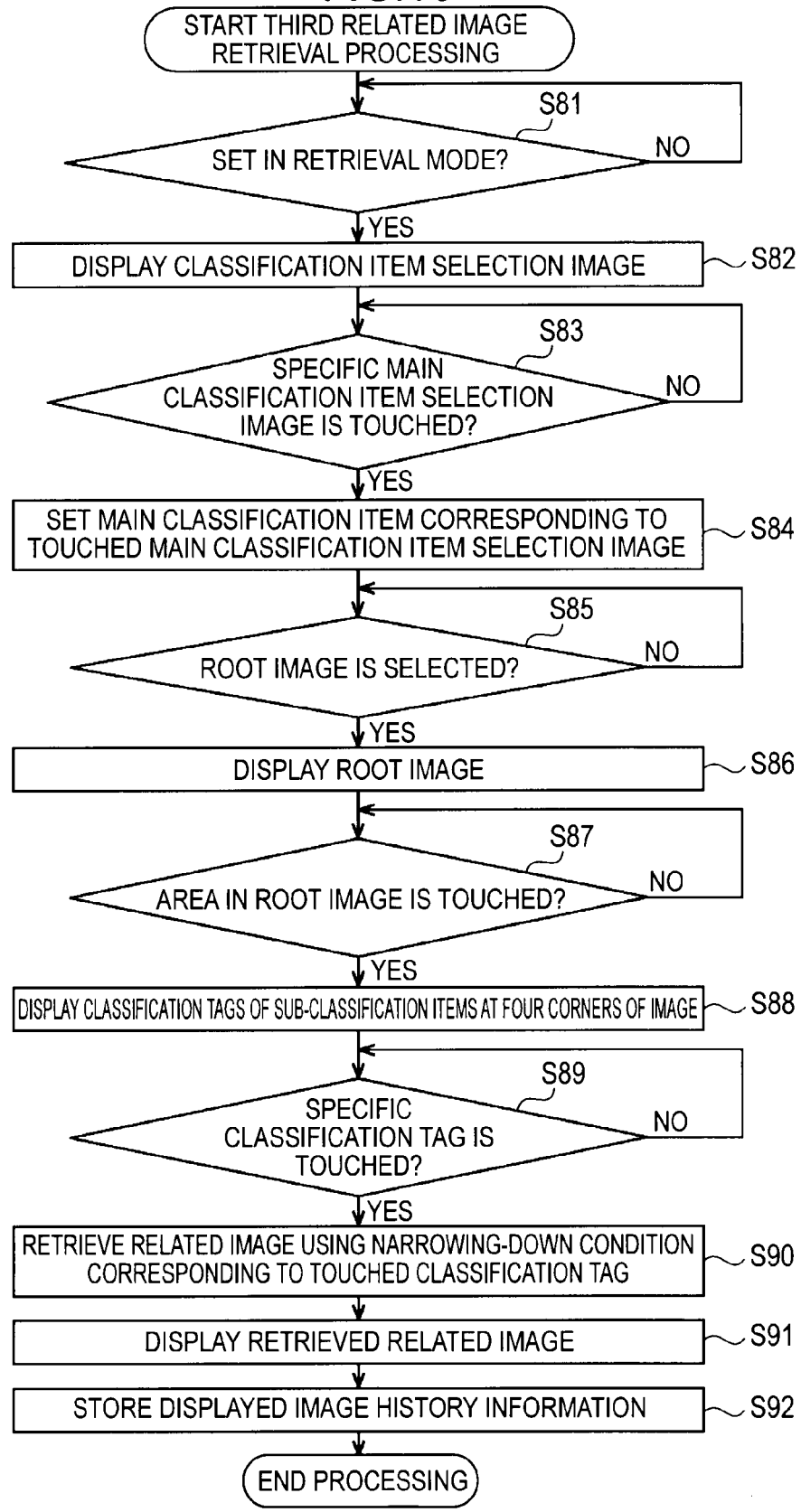

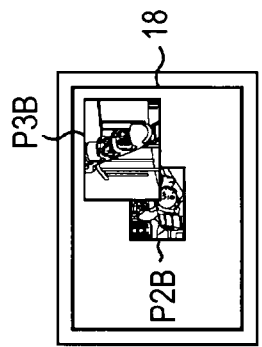
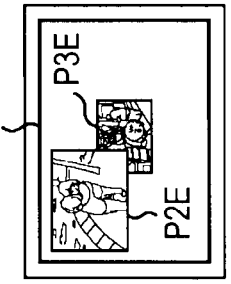
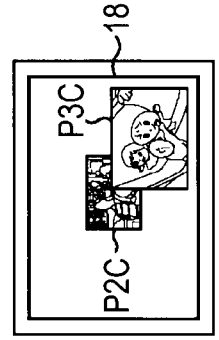
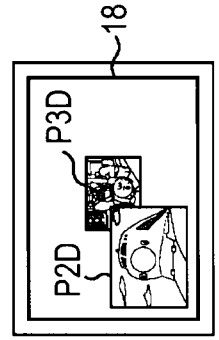
FIG.12A, FIG.12B, FIG.12C, FIG.12D, FIG.12E

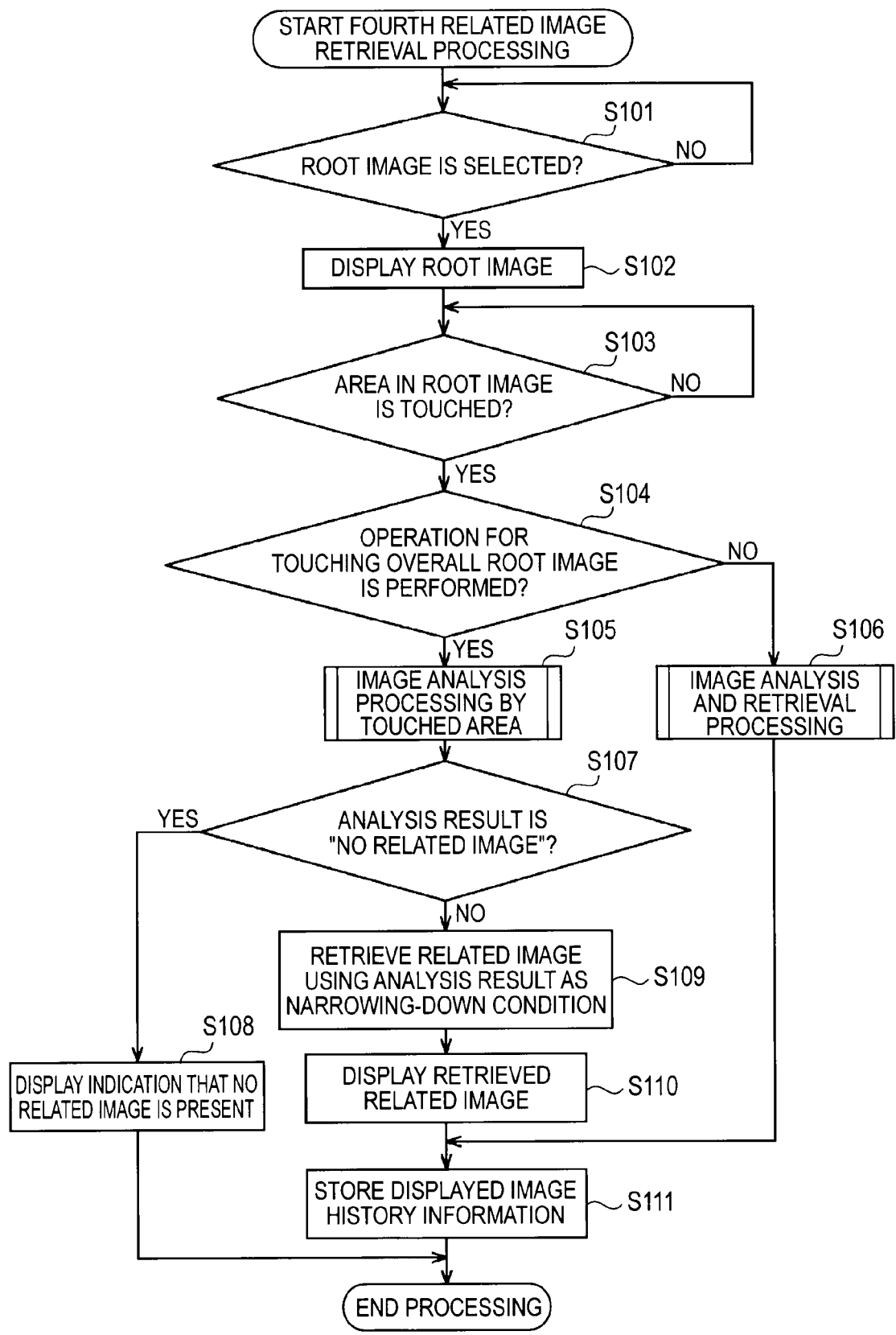

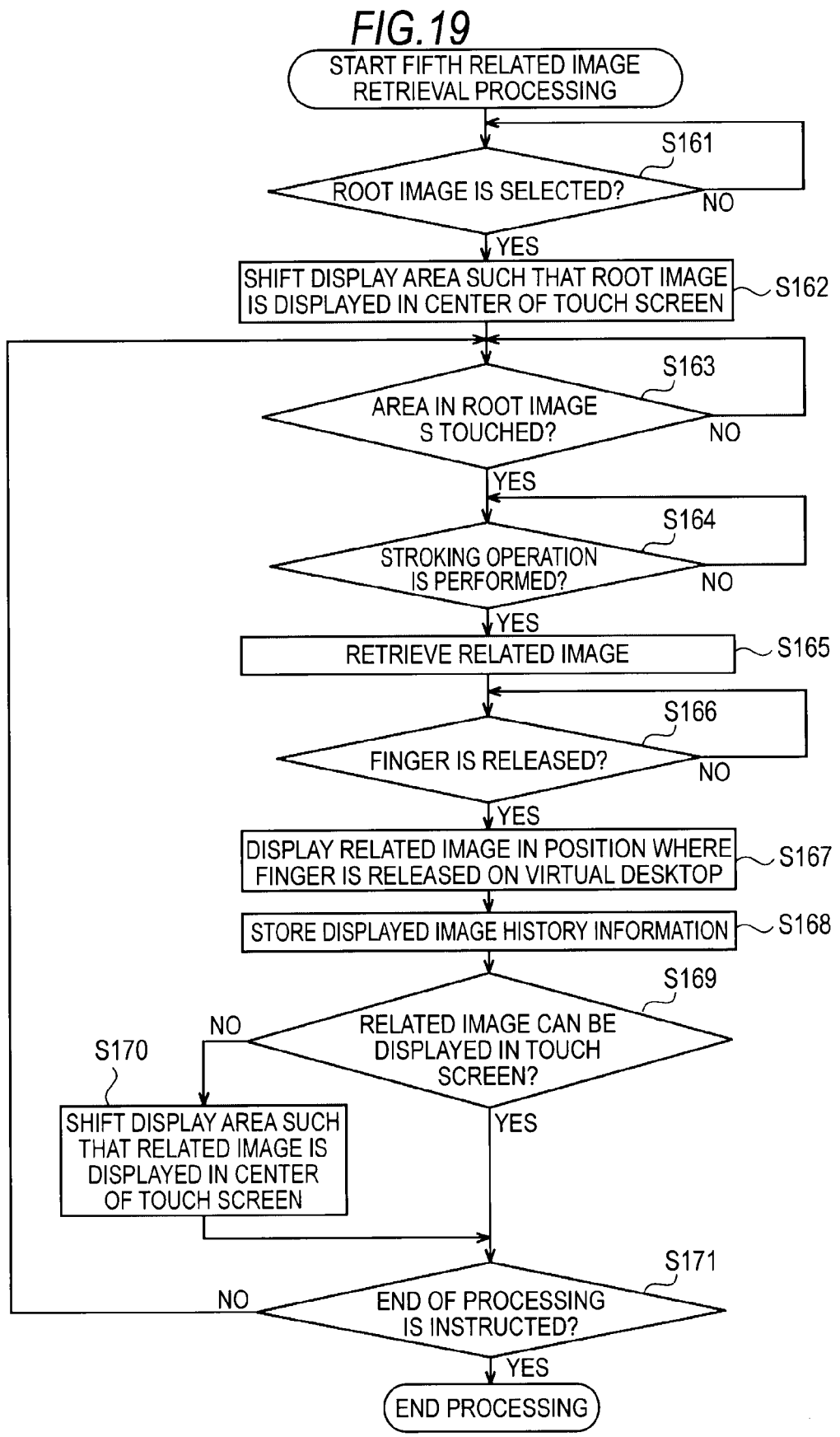

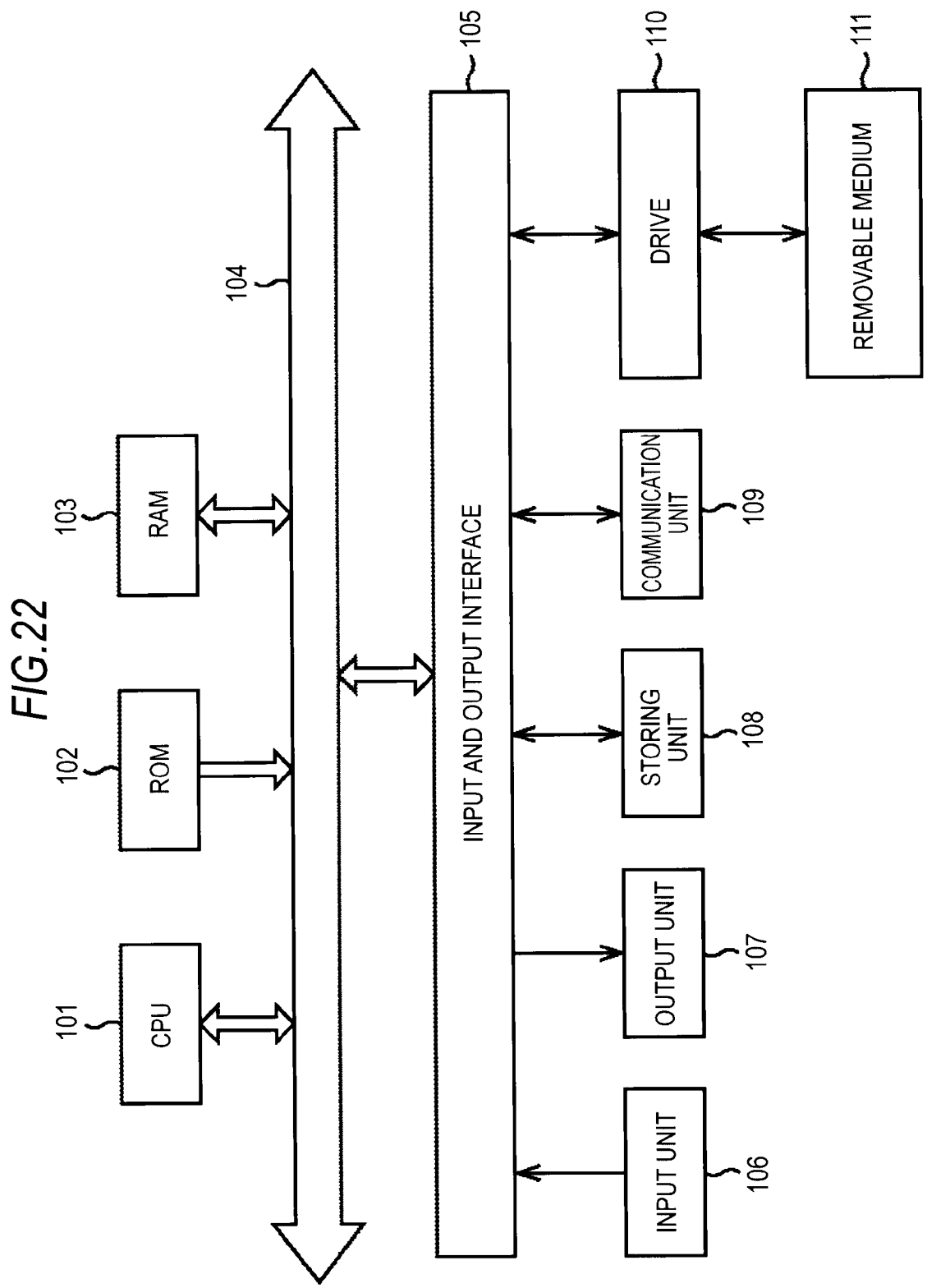

INFORMATION PROCESSING APPARATUS AND METHOD AND COMPUTER PROGRAM

BACKGROUND OF THE INVENTION

1. Field of the Invention

The present invention relates to an information processing apparatus and an information processing method and a computer program, and, more particularly to an information processing apparatus and an information processing method and a computer program that allow a user to easily retrieve arbitrary images or retrieve only characteristic images among images photographed so far and view the images.

2. Description of the Related Art

In a digital camera (see JP-A-2007-019685), the number of photographed images increases as a user uses the digital camera for more years. As a result, the user often stores too many images to manage in a built-in flash memory or a removable medium.

In such a case, in digital cameras in recent years, as a method of representing images, a method of representing the images as one group (folder, etc.) on the basis of date, time, or the like (hereinafter referred to as the representation method in the past) is often adopted.

SUMMARY OF THE INVENTION

However, when the representation method in the past is adopted, for the user, one group means a group of certain events. Therefore, even if the representation method in the past is adopted, as the user uses the digital camera for more years, the number of groups of events also increases. This makes it difficult for the user to manage the groups of events.

In recent years, there are quite a few demands for retrieving arbitrary images or retrieving only characteristic images among images photographed so far and viewing the images, specifically, for example, retrieving only images in which the same person is shown and viewing the images.

To meet such demands using the representation method in the past, although images included in the group of events have a relation, it is not easy to check a relation with other events. Therefore, the user needs to check the groups of events making full use of an index screen and the like or use retrieval application software having a retrieval function.

However, even when the user uses the retrieval application software in the past, it is difficult for the user to reach a desired image unless the user appropriately sets a search word. There are many users who may not be able to sufficiently represent images with normal character strings and expressions in image retrieval and desire to retrieve images with abstract words and senses. However, when such users use the retrieval application software in the past, it is difficult for the users to obtain expected results.

As explained above, under the present situation, it is difficult to meet the demands for retrieving arbitrary images or retrieving only characteristic images among images photographed so far and viewing the images.

Therefore, it is desirable to allow a user to easily retrieve arbitrary images or retrieve characteristic images among images photographed so far and view the images.

According to an embodiment of the present invention, there is provided an information processing apparatus including: display means for displaying an image; operation-input receiving means for receiving operation input of a user; and display control means for performing, when the operation-input receiving means receives predetermined operation for a root image displayed on the display means, display control for causing the display means to display a related image related to the root image.

Degrees of relation between all images that could be the root image or the related image and other images are calculated on the basis of one or more classification items. The display control means retrieves one or more related images out of all the images on the basis of the degrees of relation between the root image and the other images and causes the display means to display the retrieved one or more related images.

The classification items are determined in advance on the basis of additional information concerning the images.

When the display control means causes the display means to display the root image, the display control means retrieves the one or more related images.

The display control means causes, when operation by the user for moving a finger in a predetermined direction by a predetermined distance while keeping the finger in contact with the display means is represented as stroking operation, the display means to display the related image when the operation-input receiving means receives the stroking operation.

The display control means causes the display means to display the related image in a position where the stroking operation ends.

A predetermined one of the one or more classification items is associated with each of directions of the stroking operation. The display control means retrieves the one or more related images on the basis of degrees of relation calculated on the basis of the classification items corresponding to the directions of the stroking operation.

The display control means causes the display means to sequentially display new related images every time the operation-input receiving means receives the stroking operation.

The display control means sets, when the operation-input receiving means receives the stroking operation for the related image, the related image as a new root image and causes the display means to display a new related image related to the new root image.

The stroking operation is performed starting from the root image or the related image.

The display control means further causes, when the operation-input receiving means receives contact operation for the root image by the finger of the user, the display means to display classification item images indicating the respective one or more classification items and retrieves, when contact operation by the finger of the user for a predetermined one of the one or more classification item images is detected, the one or more related images on the basis of a degree of relation calculated on the basis of the classification item indicated by the classification item image for which the contact operation is performed.

The control means analyzes, when the operation-input receiving means receives the contact operation for the root image by the finger of the user, an image based on a position where the contact operation is performed, specifies the classification item on the basis of a result of the analysis, and retrieves the one or more related images on the basis of a degree of relation calculated on the basis of the specified classification item.

The information processing apparatus further includes storing means for storing history information of the display control by the display control means.

As the display control, the display control means further causes, when the operation-input receiving means receives contact operation for the root image or the related image by the finger of the user, the display means to display the history information stored in the storing means.

The display control means retrieves, when the operation-input receiving means receives contact operation by the finger of the user for an image included in the history information, the one or more related images with the image set as the root image and causes the display means to display the related images.

According to another embodiments of the present invention, there are provided an information processing method and a computer program corresponding to the information processing apparatus.

In the information processing method and the computer program of the embodiments of the present invention, in the information processing apparatus that displays an image and receives operation input of a user, when predetermined operation for a displayed root image is received, a related image related to the root image is displayed.

As explained above, according to the embodiments of the present invention, since images photographed so far are set as root images or related images, it is possible to easily retrieve arbitrary images or retrieve only characteristic images among the images photographed so far and view the images.

BRIEF DESCRIPTION OF THE DRAWINGS

FIG. 4 is a flowchart for explaining an example of first related image retrieval processing;

FIG. 5 is a flowchart for explaining an example of 1A-th related image retrieval processing;

FIG. 6 is a flowchart for explaining an example of 1B-th related image retrieval processing;

FIGS. 7A to 7E are diagrams for explaining a second example of the related image retrieval operation method of the imaging apparatus;

FIG. 8 is a flowchart for explaining an example of second related image retrieval processing;

FIGS. 9A to 9F are diagrams for explaining a third example of the related image retrieval operation method of the imaging apparatus;

FIG. 10 is a flowchart for explaining an example of third related image retrieval processing;

FIGS. 12A to 12E are diagrams for explaining a fourth example of the related image retrieval operation method of the imaging apparatus;

FIG. 13 is a flowchart for explaining an example of fourth related image retrieval processing;

FIG. 19 is a flowchart for explaining an example of fifth related image retrieval processing;

FIG. 22 is a block diagram of a configuration example of an information processing apparatus according to the embodiment of the present invention different from the configuration example shown in FIG. 1.

DESCRIPTION OF THE PREFERRED EMBODIMENTS

Embodiments of the present invention are explained in detail below with reference to the accompanying drawings.

Figure 1:
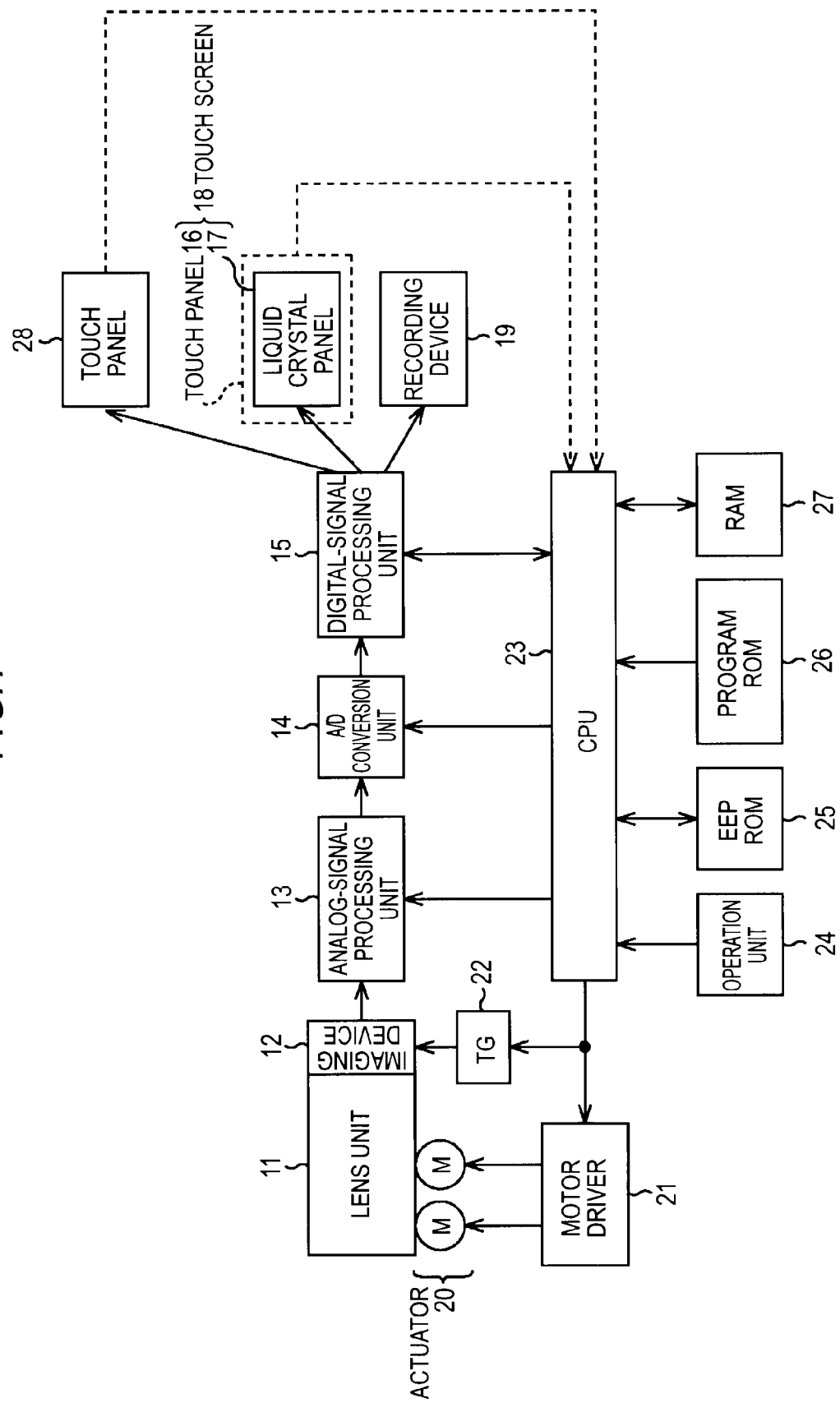
FIG. 1 is a block diagram of a configuration example of an imaging apparatus as an example of an information processing apparatus according to an embodiment of the present invention.

FIG. 1 is a block diagram of a configuration example of an imaging apparatus as an example of an information processing apparatus according to an embodiment of the present invention.

In the example shown in FIG. 1, the imaging apparatus includes components ranging from a lens unit 11 to a touch panel 28.

The lens unit 11 includes a photographing lens, a stop, and a focus lens. An imaging device 12 such as a CCD (Charge Coupled Device) is arranged on an optical path of object light made incident via the lens unit 11.

The imaging device 12, an analog-signal processing unit 13, an A/D (Analog/Digital) conversion unit 14, and a digital-signal processing unit 15 are connected in this order.

A liquid crystal panel 17, a recording device 19, and a touch panel 28 are connected to the digital-signal processing unit 15.

An actuator 20 for performing adjustment of the stop included in the lens unit 11 and movement of the focus lens is connected to the lens unit 11. A motor drive 21 is also connected to the actuator 20. The motor drive 21 performs driving control for the actuator 20.

A CPU (Central Processing Unit) 23 controls the entire imaging apparatus. Therefore, the analog-signal processing unit 13, the A/D conversion unit 14, the digital-signal processing unit 15, the motor drive 21, a TG (Timing Generator) 22, an operation unit 24, an EEPROM (Electrically Erasable Programmable ROM) 25, a program ROM (Read Only Memory) 26, a RAM (Random Access Memory) 27, a touch panel 16, and the touch panel 28 are connected to the CPU 23.

A touch screen 18 includes the touch panel 16 and the liquid crystal panel 17. The touch panel 28 is arranged on a surface of the imaging apparatus opposed to the touch screen 18, i.e., a surface on an imaging lens side (see FIGS. 2A and 2B referred to later).

The recording device 19 includes an optical disk such as a DVD (Digital Versatile Disc), a semiconductor memory such as a memory card, or other removable recording media. The recording device 19 is detachably attachable to an imaging apparatus main body.

The EEPROM 25 stores set various kinds of information. Other information such as information that should be stored even when a power supply state is set to off is stored in the EEPROM 25.

The program ROM 26 stores a program executed by the CPU 23 and data necessary for executing the program.

The RAM 27 temporarily stores a program and data necessary as a work area when the CPU 23 executes various kinds of processing.

An overview of the operation of the entire imaging apparatus having the configuration shown in FIG. 1 is explained below.

The CPU 23 executes the program stored in the program ROM 26 to thereby control the units of the imaging apparatus. The CPU 23 executes predetermined processing according to a signal from the touch panel 16 or the touch panel 28 and a signal from the operation unit 24. A specific example of this processing is explained later with reference to flowcharts.

The operation unit 24 is operated by a user and provides the CPU 23 with a signal corresponding to the operation.

When a finger of the user is brought into contact with the touch screen 18 or the touch panel 28, for example, the finger touches an arbitrary position on the touch screen 18 or the touch panel 28, i.e., predetermined operation input is performed by the user, the touch screen 18 or the touch panel 28 detects a coordinate of the contact position. The touch screen 18 or the touch panel 28 transmits an electric signal indicating the detected coordinate (hereinafter referred to as coordinate signal) to the CPU 23. The CPU 23 recognizes the coordinate of the contact position from the coordinate signal, acquires predetermined information associated with the coordinate, and executes predetermined processing on the basis of the information.

In this specification, "contact" includes not only statistic contact (contact on only one predetermined area) but also dynamic contact (contact by a contact object such as a finger that moves while drawing a predetermined track). For example, stroking by the finger on an image like turning-over of paper is a form of the contact.

The lens unit 11 is exposed from or housed in a housing of the imaging apparatus according to the driving by the actuator 20. Further, adjustment of the stop included in the lens unit 11 and movement of the focus lens included in the lens unit 11 are performed according to the driving by the actuator 20.

The TG 22 provides the imaging device 12 of a timing signal on the basis of the control by the CPU 23. Exposure time and the like in the imaging device 12 are controlled according to the timing signal.

The imaging device 12 operates on the basis of the timing signal provided from the TG 22 to thereby receive object light made incident via the lens unit 11 and perform photoelectric conversion. The imaging device 12 provides the analog signal processing unit 13 of an analog image signal corresponding to a received light amount. The motor drive 21 drives the actuator 20 on the basis of the control by the CPU 23.

The analog-signal processing unit 13 applies, on the basis of the control by the CPU 23, analog signal processing such as amplification to the analog image signal provided from the imaging device 12. The analog-signal processing unit 13 provides the A/D conversion unit 14 with an analog image signal obtained as a result of the analog signal processing.

The A/D conversion unit 14 A/D-converts the analog image signal from the analog-signal processing unit 13 on the basis of the control by the CPU 23. The A/D conversion unit 14 provides the digital-signal processing unit 15 of a digital image signal obtained as a result of the A/D conversion.

The digital-signal processing unit 15 applies, on the basis of the control by the CPU 23, digital signal processing such as noise removal processing to the digital image signal provided from the A/D conversion unit 14. The digital-signal processing unit 15 causes the liquid crystal panel 17 to display an image corresponding to the digital image signal as a photographed image.

The digital-signal processing unit 15 compression-encodes, according to a predetermined compression encoding system such as JPEG (Joint Photographic Experts Group), the digital image signal provided from the A/D conversion unit 14. The digital-signal processing unit 15 causes the recording device 19 to record the compression-encoded digital image signal.

The digital-signal processing unit 15 reads out the compression-encoded digital image signal from the recording device 19 and expansion-decodes the digital image signal according to an expansion decoding system corresponding to the predetermined compression encoding system. The digital-signal processing unit 15 causes the liquid crystal panel 17 to display an image corresponding to the digital image signal as a recorded image.

Besides, the digital-signal processing unit 15 generates, on the basis of the control by the CPU 23, an image of a frame used for showing an AF (auto focus) function (hereinafter referred to as AF frame) and causes the liquid crystal panel 17 to display the image.

The image picked up by the imaging device 12 (the photographed image) is displayed on the liquid crystal panel 17. In this case, the AF frame is set on the image displayed on the liquid crystal panel 17. Focus is controlled on the basis of the image in the AF frame.

As explained above, the imaging apparatus has the AF function. The AF function includes, besides a focus control function, a function for setting the AF frame in an arbitrary position on the image displayed on the liquid crystal panel 17. Further, the AF function includes a function of controlling a position, a size, and the like of the AF frame according to only operation on the touch screen 18 including the liquid crystal panel 17 and the touch panel 16.

Processing for realizing the AF function is realized by the CPU 23 reading out the program in the program ROM 26 and executing the program. Besides, the imaging apparatus has an AE (Automatic Exposure) function and an AWB (Auto White Balance) function. These functions are also realized by the CPU 23 reading out the program in the program ROM 26.

Moreover, the AF function, the AE function, and the AWB function are merely illustrations of functions of the imaging apparatus. The imaging apparatus has various functions concerning photographing. Among the various kinds of functions, basic functions concerning photographing are referred to as basic functions and applied functions concerning photographing are referred to applied functions. As the basic functions, besides the AF function, the AE function, and the AWB function, for example, a "photographing mode selecting function" and a "photographing timer setting function" can be adopted. As the applied functions, for example, a "number-of-pixels changing function" and a "chroma adjusting function" can be adopted.

Figure 2A:
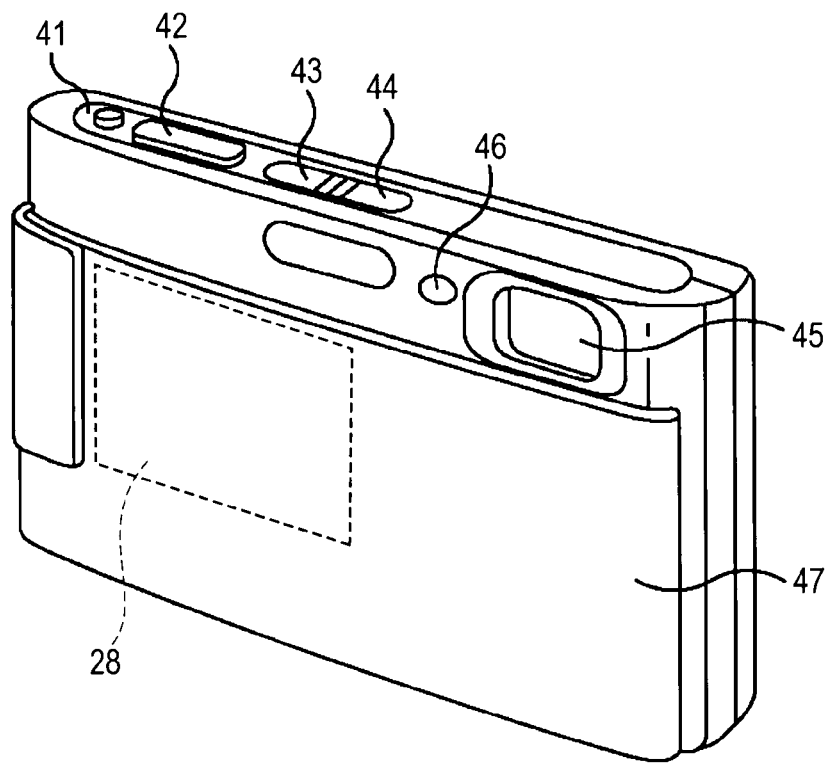
FIGS. 2A and 2B are perspective views of an external configuration example of the imaging apparatus shown in FIG. 1.
Figure 2B:
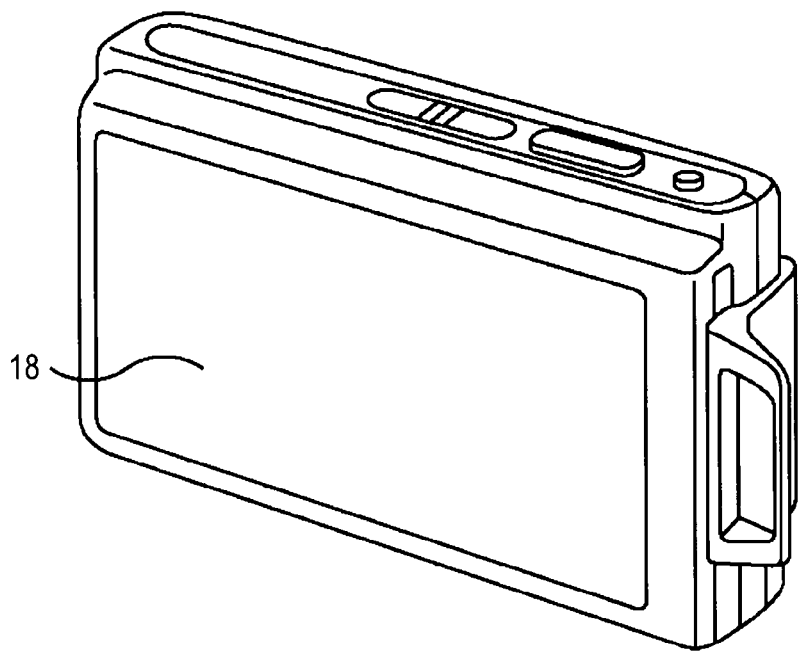

FIGS. 2A and 2B are perspective views of an external configuration example of the imaging apparatus of the example shown in FIG. 1.

Among surfaces of the imaging apparatus, a surface opposed to an object when the user photographs the object, i.e., a surface on which the lens unit 11 is arranged is referred to as front surface. On the other hand, among the surfaces of the imaging apparatus, a surface opposed to the user when the user photographs the object, i.e., a surface on the opposite side of the front surface is referred to as rear surface. Further, among the surfaces of the imaging apparatus, a surface arranged on an upper side and a surface arranged on a lower side when the user photographs the object are referred to as upper surface and lower surface, respectively.

FIG. 2A is a perspective view of an external configuration example of the front surface of the imaging apparatus. FIG. 2B is a perspective view of an external configuration example of the rear surface of the imaging apparatus.

The front surface of the imaging apparatus can be covered with a lens cover 47. When the lens cover 47 on the front surface is opened downward in the figure, the imaging apparatus changes to a state shown in FIG. 2A. As shown in FIG. 2A, in an upper part of the front surface in which the covering by the lens cover 47 is removed, a photographing lens 45 and an AF illuminator 46 included in the lens unit 11 are arranged in this order from the right of the upper part. In a lower part of the front surface covered with the lens cover 47, the touch panel 28 is arranged in a portion near the center of the imaging apparatus not held when the user photographs an object.

The AF illuminator 46 also functions as a self-timer lamp. On the upper surface of the imaging apparatus, a zoom lever (TELE/WIDE) 41, a shutter button 42, a play button 43, and a power button 44 are arranged in this order from the left of FIG. 2A. The zoom lever 41, the shutter button 42, the play button 43, and the power button 44 are included in the operation unit 24 shown in FIG. 1.

As shown in FIG. 2B, the touch screen 18 is arranged over the entire rear surface of the imaging apparatus.

As explained above, since the touch screen 18 is provided on the rear surface of the imaging apparatus, when the user photographs an object, the user can perform operation of a GUI (Graphical User Interface) by the touch screen 18 while keeping the front surface of the imaging apparatus directed to the object.

As the operation of the GUI by the touch screen 18, for example, in this embodiment, operation for searching for and retrieving, with respect to an arbitrary image as a root (hereinafter referred to as root image), an image having strong relation with the root image (hereinafter referred to as related image) is adopted. Such operation is operation for which it is unnecessary to provide a special retrieval screen or the like and is intuitive operation performed by using the touch screen 18. Therefore, the operation is operation for allowing the user to easily find out a related image. Therefore, such operation is hereinafter referred to as related image retrieval operation.

As a premise for the related image retrieval operation, it is assumed that targets that could be the root image or the related image (hereinafter referred to as retrieval target images) are all images recorded in the recording device 19. It is assumed that, for all the retrieval target images, a degree of strength of relation is already retrieved on a database or the like in advance on the basis of, for example, additional information explained below.

The retrieval concerning the degree of strength of relation is not limited to the example explained above. The degree of strength of relation may be retrieved every time the related image retrieval operation is performed. However, for simplification of explanation, it is assumed that the degree of strength of relation is already retrieved in advance in all embodiments described in this specification.

As the additional information, for example, in this embodiment, it is assumed that face information, position/place information, time information, and color information are adopted. The face information means information concerning a human face and information enough for identifying a person. The position/place information means information concerning the latitude and the longitude obtained by the GPS (Global Positioning System) or the like or information (a place name) that can be recognized as a specific place by image recognition for an image. The time information means information concerning photographing time. The color information means information concerning a color used in a largest number of places in the image.

The retrieval target image is not limited to a still image and includes a moving image. However, when the moving image is the retrieval target image, additional information of the moving image is an information group obtained from respective unit images (fields, frames, and the like) forming the moving image.

The root image is distinguished from other images and displayed to clearly indicate the root image. For example, the root image may be displayed larger than the other images, may be displayed brighter than the other images, or may be surrounded by a frame.

A first example of the related image retrieval operation is explained below with reference to FIGS. 3A to 3E.

First, the user selects an arbitrary image as a root image P1. Selection operation itself is not specifically limited. When the root image P1 is selected, a display state of the touch screen 18 changes to a state shown in FIG. 3A. A state in which the root image P1 is displayed on the touch screen 18 is shown in FIG. 3A.

Figure 3A:
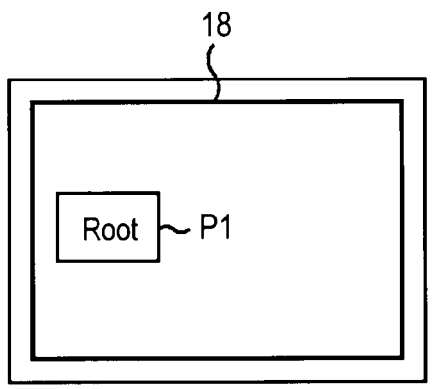
FIGS. 3A to 3E are diagrams for explaining a first example of a related image retrieval operation method of the imaging apparatus.
Figure 3B:
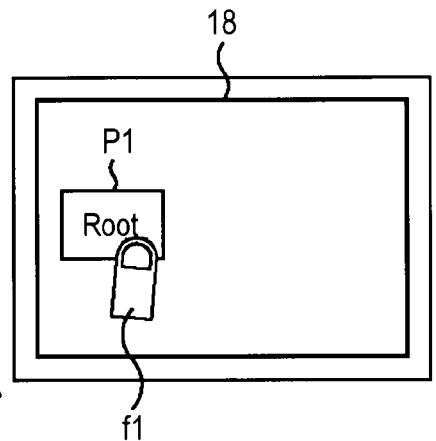
Figure 3C:
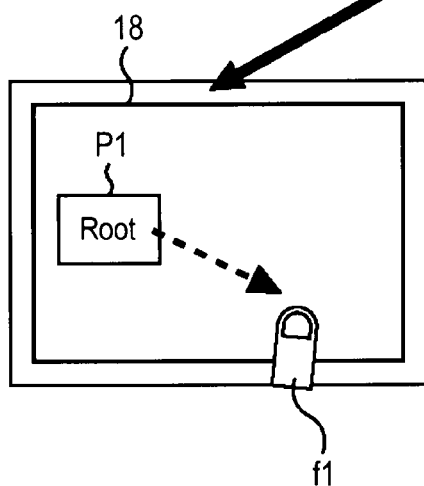

While the display state of the touch screen 18 is in the state shown in FIG. 3A, the user brings a finger f1 into contact with the root image P1 (an area on the touch screen 18 in which the root image P1 is displayed) as shown in FIG. 3B. Then, as shown in FIG. 3C, the user performs operation for moving the finger f1 in a predetermined direction by a predetermined distance (in the example shown in FIGS. 3A to 3E, a distance indicated by a dotted line arrow) starting from the root image P1 while maintaining the contact with the touch screen 18. Such operation is hereinafter referred to as stroking operation.

Figure 3D:
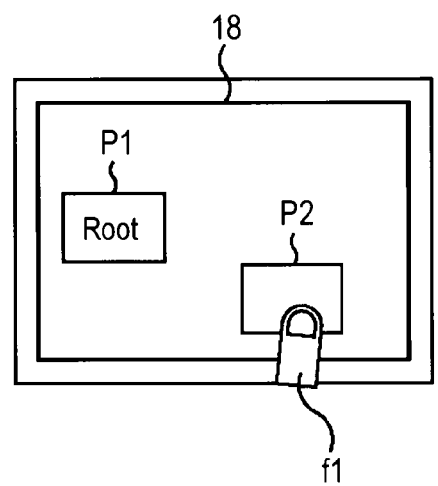

Thereafter, when the user releases the finger f1, the display state of the touch screen 18 transitions to a state shown in FIG. 3D. On a touch screen 18, a related image P2 of the root image P1 is displayed in an area where the finger f1 is released while the root image P1 is displayed in an original area. The related image P2 may be any one of plural related images related to the root image P1. However, in this embodiment, an image having a highest degree of strength of relation with the root image P1 is displayed as the related image P2.

Figure 3E:
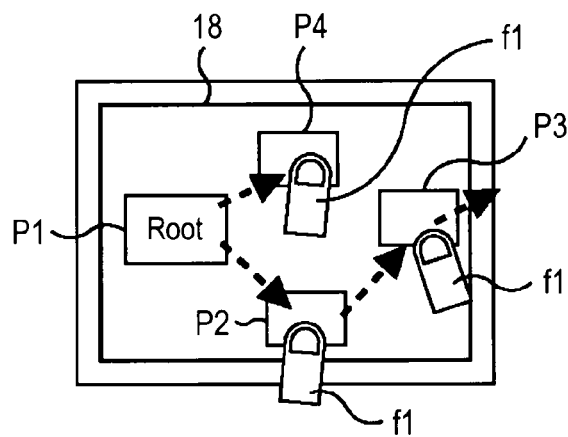

Further, when the user releases the finger f1 after bringing the finger f1 into contact with the related image P2 and performing the stroking operation, as shown in FIG. 3E, a related image P3 is displayed in an area where the finger f1 is released.

The related image P3 is a related image of the root image P1 in some case and is a related image of the related image P2 in other cases.

When the user releases the finger f1 from the touch screen 18, this means the end of the stroking operation. Therefore, every time the stroking operation is performed, related images of the root image P1 are sequentially displayed in an area at a point of the stroking operation end on the touch screen 18 in order of degrees of strength of relation of the related images. In other words, the user can perform the operation as if the user searches for related images by repeating the stroking operation.

Further, it is also possible to give meaning to directions of the stroking operation. Respective classification items of relationship with the root image P1 are associated with the respective directions of the stroking operation. Consequently, when the stroking operation is repeatedly executed in a predetermined direction, related images are sequentially displayed on the touch screen 18 in order of degrees of strength of relation of classification items associated with the predetermined direction. Such classification items can be grasped as retrieval conditions for related images. Therefore, the classification items are also referred to as narrowing-down conditions as appropriate.

Specifically, for example, in this embodiment, it is assumed that "person", "place", "time", and "color" are adopted as the narrowing-down conditions (the classification items). In this case, it is assumed that degrees of strength of relation of "person", "place", "time", and "color" are already retrieved in advance respectively using the face information, the position/place information, the time information, and the color information of the additional information.

For example, it is assumed that "time" is associated with an oblique upper right direction of the stroking operation and "person" is associated with an oblique lower right direction of the stroking operation.

In this case, for example, the related image P2 shown in FIG. 3E, i.e., the related image P2 displayed after the stroking operation in the oblique lower right direction is performed is a related image having strong relation concerning "person" with the root image P1, for example, a related image including the same person as in the root image P1.

On the other hand, for example, a related image P4 shown in FIG. 3E, i.e., the related image P4 displayed after the stroking operation in the oblique upper right direction is performed is a related image having strong relation concerning "time" with the root image P1, for example, a related image photographed at time close to photographing time of the root image P1.

Processing executed by the imaging apparatus shown in FIG. 1 in response to the operation example according to FIGS. 3A to 3E, i.e., the operation of the first example of the related image retrieval operation is explained. Processing executed by the imaging apparatus in response to the related image retrieval operation is hereinafter referred to as related image retrieval processing. In particular, related image retrieval processing responding to operation of a Kth example (K is an integer value equal to or larger than 1) of the related image retrieval operation according to this embodiment is referred to as Kth related image retrieval processing.

A detailed example of first related image retrieval processing performed when a related image retrieved by the related image retrieval operation is a related image (in the example shown in FIGS. 3A to 3E, the related image P2 or P4) of a root image (in the example shown in FIGS. 3A to 3E, the root image P1) is 1A-th related image retrieval processing. A detailed example of the first related image retrieval processing performed when a related image retrieved by the related image retrieval operation is related image (in the example shown in FIGS. 3A to 3E, the related image P3) of a related image (in the example shown in FIGS. 3A to 3E, the related image P2) is 1B-th related image retrieval processing. These kinds of processing are explained later with reference to FIGS. 5 and 6.

FIG. 4 is a flowchart for explaining an example of the first related image retrieval processing.

In step S1, the CPU 23 determines whether a root image is selected.

When a root image is not selected, the CPU 23 determines in step S1 that a root image is not selected (NO in step S1) and returns the processing to step S1. Until a root image is selected, the CPU 23 repeatedly executes the determination processing in step S1.

Thereafter, when a root image is selected, the CPU 23 determines that a root image is selected (YES in step S1) and the processing proceeds to step S2.

In step S2, the CPU 23 controls the digital-signal processing unit 15 to display the root image on the touch screen 18. The root image can be displayed in an arbitrary area of the touch screen 18. However, it is advisable to display the root image in an area determined by taking into account easiness of the stroking operation after that. For example, in the example shown in FIGS. 3A to 3E, as shown in FIG. 3A, the root image P1 is displayed in an area at the left end of the touch screen 18 by taking into account the stroking operation in the right direction.

In step S3, the CPU 23 determines whether an area in the root image of the touch screen 18 is touched.

When no area in the root image is touched, the CPU 23 determines in step S3 that no area in the root image is touched (NO in step S3) and returns the processing to step S3. Until any one of areas in the root image is touched, the CPU 23 repeatedly executes the determination processing in step S3.

Thereafter, when any area in the root image is touched, the CPU 23 determines in step S3 that an area in the root image is touched (YES in step S3) and the processing proceeds to step S4.

For example, as shown in FIG. 3B, when the finger f1 touches an area in the root image P1, a coordinate signal is input to the CPU 23 from the touch panel 16 included in the touch screen 18.

Therefore, when the coordinate signal is input to the CPU 23, in the processing in step S3, the CPU 23 determines that an area in the root image is touched (YES in step S3) and recognizes a contact place (a coordinate of the root image P1) from the coordinate signal.

When the recognized contact place is outside a display area of the root image P1, the CPU 23 determines in step S3 that no area in the root image is touched (NO in step S3), returns the processing to step S3, and repeats the processing in step S3 and subsequent steps.

On the other hand, when the recognized contact place is inside the display area of the root image P1, the CPU 23 determines in step S3 that an area in the root image is touched (YES in step S3) and the processing proceeds to step S4.

In step S4, the CPU 23 determines whether the stroking operation is performed starting from the root image.

The CPU 23 can determine, by monitoring a coordinate signal from the touch panel 16 included in the touch screen 18, whether the stroking operation is performed. In other words, the CPU 23 can recognize a track of the finger f1 from a time series of the coordinate signal. Therefore, the CPU 23 detects, on the basis of a result of the recognition, whether the stroking operation is carried out.

Therefore, when the stroking operation is not detected according to the recognition result of the track of the finger f1, the CPU 23 determines in step S4 that the stroking operation is not performed (NO in step S4), returns the processing to step S4, and repeatedly executes the processing in step S4 and subsequent steps. In other words, until the stroking operation is detected, the CPU 23 repeatedly executes the determination processing in step S4.

Thereafter, when the stroking operation starting from the root image is detected according to the recognition result of the track of the finger f1, the CPU 23 determines in step S4 that the stroking operation is performed (YES in step S4) and advances the processing to step S5. For example, in the example shown in FIGS. 3A to 3E, when the display state of the touch screen 18 changes to the state shown in FIG. 3C, the CPU 23 determines in step S4 that the stroking operation is performed (YES in step S4) and advances the processing to step S5.

In step S5, the CPU 23 retrieves a related image from all the images recorded in the recording device 19. In this embodiment, the CPU 23 retrieves an image having a highest degree of strength of relation with the root image as a related image. However, when various narrowing-down conditions are set, a related image is retrieved by using narrowing-down conditions associated with directions of the stroking operation.

In step S6, the CPU 23 determines whether the finger f1 is released from the touch screen 18, i.e., whether the stroking operation is finished. Specifically, when a coordinate signal is not input from the touch panel 16 included in the touch screen 18 any more, the CPU 23 can determine that the finger f1 is released.

Therefore, as long as a coordinate signal is input, the CPU 23 determines in step S6 that the finger f1 is not released (NO in step S6) and returns the processing to step S6. In other words, as long as the stroking operation is continued, the CPU 23 repeatedly executes the determination processing in step S6.

Thereafter, when the input of a coordinate signal cuts off, i.e., when the stroking operation ends, the CPU 23 determines in step S6 that the finger f1 is released (YES in step S6) and the processing proceeds to step S7.

In step S7, the CPU 23 controls the digital-signal processing unit 15 to display a related image in a position where the finger f1 is released on the touch screen 18.

For example, in the example shown in FIGS. 3A to 3E, when the finger f1 is released in a position shown in FIG. 3D on the touch screen 18, the related image P2 is displayed in the position.

In step S8, the CPU 23 determines whether the end of the processing is instructed.

Unless the end of the processing is instructed, the CPU 23 determines in step S8 that the end of the processing is not instructed (NO in step S8), returns the processing to step S3, and repeats the processing in step S3 and subsequent steps. Specifically, every time the stroking operation starting from a root image (e.g., the root image P1 shown in FIGS. 3A to 3E) is performed, the loop processing of YES in step S3, YES in step S4, step S5, YES in step S6, step S7, and NO in step S8 is repeatedly executed and a new related image is displayed in a position where the finger f1 is released (a position where the stroking operation ends). Consequently, plural related images (e.g., the related images P2 and P4 shown in FIGS. 3D and 3E) can be displayed with respect to the root image (e.g., the root image P1 shown in FIGS. 3A to 3E). In other words, by repeating the stroking operation, the user can repeatedly executes the loop processing of YES in step S4, step S5, YES in step S6, step S7, and NO in step S8 as if the user searches for a related image of a root image.

Thereafter, when the end of the processing is instructed, the CPU 23 determines in step S8 that the end of the processing is instructed (YES in step S8) and the processing proceeds to step S9.

In step S9, as a result of the processing in steps S1 to S8, the CPU 23 stores history information of the root images and the various related images displayed on the touch screen 18 (hereinafter referred to as displayed image history information) in the recording device 19.

Consequently, the first related image retrieval processing ends.

Although not shown in the figure, for example, the CPU 23 can also control the digital-signal processing unit 15 to display, when contact operation on a root image or a related image by the finger f1 or the like of the user is detected, the displayed image history information stored in the recording device 19 on the touch screen 18.

Although not shown in the figure, for example, the CPU 23 can retrieve, when contact operation on an image included in the displayed image history information by the finger f1 or the like of the user is detected, one or more related images with the image set as a root image and cause the touch screen 18 to display the related images.

The first example of the related image retrieval operation is explained above with reference to FIGS. 3A to 3E. The example of the first related image retrieval processing corresponding to the first example is explained above with reference to the flowchart of FIG. 4.

An example of 1A-th related image retrieval processing corresponding to the first example is explained below with reference to a flowchart of FIG. 5. The example is a detailed example of the first related image retrieval processing performed when a related image retrieved by the related image retrieval operation is a related image of a root image (the root image P1 in the example shown in FIGS. 3A to 3E).

Respective kinds of processing in steps S21 to S27 in FIG. 5 are kinds of processing basically the same as the respective kinds of processing in steps S1 to S7 in FIG. 4. Therefore, explanation of these kinds of processing is omitted.

Therefore, processing after the CPU 23 controls, in processing in step S27, the digital-signal processing unit 15 to display a related image in a position where a finger is released on the touch screen 18 is explained. When such processing in step S27 ends, the processing proceeds to step S28.

In step S28, the CPU 23 determines whether an area in the related image displayed on the touch screen 18 is touched. In other words, the CPU 23 determines whether an area in the related image (in the example shown in FIGS. 3A to 3E, the related image P2) displayed in step S27 is touched.

When no area in the related image is touched, the CPU 23 determines in step S28 that no area in the related image is touched (NO in step S28) and returns the processing to step S28. Until any area in the related image is touched, the CPU 23 repeatedly executes the determination processing in step S28.

Thereafter, when any area in the related image is touched, the CPU 23 determines in step S28 that an area in the related image is touched (YES in step S28) and the processing proceeds to step S29.

For example, as shown in FIG. 3E, when the finger f1 touches an area in the related image P2, a coordinate signal is input to the CPU 23 from the touch panel 16 included in the touch screen 18.

Therefore, when the coordinate signal is input to the CPU 23, in the processing in step S28, the CPU 23 determines that an area in the root image is touched (YES in step S28) and recognizes a contact place (a coordinate of the root image P2) from the coordinate signal.

When the recognized contact place is outside a display area of the root image P2, the CPU 23 determines in step S28 that no area in the root image is touched (NO in step S28), the processing is returned to step S28, and the processing in step S28 and subsequent steps is repeated.

On the other hand, when the recognized contact place is inside the display area of the root image P2, the CPU 23 determines in step S28 that an area in the root image is touched (YES in step S28) and the processing proceeds to step S29.

In step S29, the CPU 23 determines whether the stroking operation is performed starting from the root image.

The CPU 23 can determine, by monitoring a coordinate signal from the touch panel 16 included in the touch screen 18, whether the stroking operation is performed. In other words, the CPU 23 can recognize a track of the finger f1 from a time series of the coordinate signal. Therefore, the CPU 23 detects, on the basis of a result of the recognition, whether the stroking operation is carried out.

Therefore, when the stroking operation is not detected according to the recognition result of the track of the finger f1, the CPU 23 determines in step S29 that the stroking operation is not performed (NO in step S29), returns the processing to step S29, and repeatedly executes the processing in step S29 and subsequent steps. In other words, until the stroking operation is detected, the CPU 23 repeatedly executes the determination processing in step S29.

Thereafter, when the stroking operation starting from the related image is detected according to the recognition result of the track of the finger f1, the CPU 23 determines in step S29 that the stroking operation is performed (YES in step S29) and advances the processing to step S30.

In step S30, the CPU 23 retrieves a related image from all the images recorded in the recording device 19. In this embodiment, the CPU 23 retrieves an image having a highest degree of strength of relation with the root image as a related image. However, an image having a highest degree of strength of relation with the root image P1 excluding a related image displayed at present (in the example shown in FIGS. 3A to 3E, the related image P2) among related images of the root image P1 is displayed as the related image P3. In other words, the related image P3 is an image having a second highest degree of strength of relation with the root image P1 next to the related image P2. When various narrowing-down conditions are set, a related image is retrieved by using narrowing-down conditions associated with directions of the stroking operation.

In step S31, the CPU 23 determines whether the finger f1 is released from the touch screen 18, i.e., whether the stroking operation is finished. Specifically, when a coordinate signal is not input from the touch panel 16 included in the touch screen 18 any more, the CPU 23 can determine that the finger f1 is released.

Therefore, as long as a coordinate signal is input, the CPU 23 determines in step S31 that the finger f1 is not released (NO in step S31) and returns the processing to step S31. In other words, as long as the stroking operation is continued, the CPU 23 repeatedly executes the determination processing in step S31.

Thereafter, when the input of a coordinate signal cuts off, i.e., when the stroking operation ends, the CPU 23 determines in step S31 that the finger f1 is released (YES in step S31) and the processing proceeds to step S32.

In step S32, the CPU 23 controls the digital-signal processing unit 15 to display a related image in a position where the finger f1 is released on the touch screen 18.

For example, in the example shown in FIGS. 3A to 3E, when the finger f1 is released in a position P3 shown in FIG. 3E on the touch screen 18, the related image P3 is displayed in the position.

In step S33, the CPU 23 determines whether the end of the processing is instructed.

Unless the end of the processing is instructed, the CPU 23 determines in step S33 that the end of the processing is not instructed (NO in step S33), returns the processing to step S23, and repeats the processing in step S23 and subsequent steps. Specifically, every time the stroking operation starting from a root image (e.g., the root image P1 shown in FIGS. 3A to 3E) is performed, the loop processing of steps S23 to S33 is repeatedly executed and a new related image is displayed in a position where the finger f1 is released (a position where the stroking operation ends). Consequently, plural related images (e.g., the related images P2 and P4 shown in FIGS. 3D and 3E) can be displayed with respect to the root image (e.g., the root image P1 shown in FIGS. 3A to 3E). In other words, by repeating the stroking operation, the user can repeatedly execute the loop processing of steps S23 to S33 as if the user searches for a related image of a root image.

Thereafter, when the end of the processing is instructed, the CPU 23 determines in step S33 that the end of the processing is instructed (YES in step S33) and the processing proceeds to step S34.

In step S34, as a result of the processing in steps S21 to S33, the CPU 23 stores history information of the root images and the various related images displayed on the touch screen 18 (hereinafter referred to as displayed image history information) in the recording device 19.

Consequently, the 1A-th related image retrieval processing ends.

An example of 1B-th related image retrieval processing corresponding to the first example is explained with reference to a flowchart of FIG. 6. The example is a detailed example of first related image retrieval processing performed when a related image retrieved by related image retrieval operation is a related image of a related image (in the example shown in FIGS. 3A to 3E, the related image P2).

Respective kinds of processing in steps S41 to S47 in FIG. 6 are processing basically the same as the respective kinds of processing in steps S1 to S7 in FIG. 4. Therefore, explanation of these kinds of processing is omitted.

Therefore, processing after the CPU 23 controls, in processing in step S47, the digital-signal processing unit 15 to display a related image in a position where a finger is released on the touch screen 18 is explained. When such processing in step S47 ends, the processing proceeds to step S48.

In step S48, the CPU 23 sets the related image as a root image. Specifically, the CPU 23 sets the related image (in the example shown in FIGS. 3A to 3E, the related image P2) displayed in step S47 as a root image.

In step S49, the CPU 23 determines whether the end of the processing is instructed.

Unless the end of the processing is instructed, the CPU 23 determines in step S49 that the end of the processing is not instructed (NO in step S49), returns the processing to step S43, and repeats the processing in step S43 and subsequent steps. Specifically, every time the stroking operation starting from a root image (e.g., the root image P1 or P2 shown in FIGS. 3A to 3E) is performed, the loop processing of steps S43 to S49 is repeatedly executed and a new related image is displayed in a position where the finger f1 is released (a position where the stroking operation ends). Consequently, plural related images (e.g., the related image P3 shown in FIG. 3E) can be displayed with respect to the root image (e.g., the root image P1 or P2 shown in FIGS. 3A to 3E). In other words, by repeating the stroking operation, the user can repeatedly execute the loop processing of steps S43 to S49 as if the user searches for a related image of a root image.

Thereafter, when the end of the processing is instructed, the CPU 23 determines in step S49 that the end of the processing is instructed (YES in step S49) and the processing proceeds to step S50.

In step S50, as a result of the processing in steps S41 to S49, the CPU 23 stores history information of the root images and the various related images displayed on the touch screen 18

(hereinafter referred to as displayed image history information) in the recording device 19.

Consequently, the 1B-th related image retrieval processing ends.

A second example of the related image retrieval operation is explained with reference to FIGS. 7A to 7E. An example of second related image retrieval processing corresponding to the second example is explained with reference to a flowchart of FIG. 8.

First, the user selects an arbitrary image as the root image P1. Selection operation itself is not specifically limited. When the root image P1 is selected, a display state of the touch screen 18 changes to a state shown in FIG. 7A. FIG. 7A is a diagram of a state in which the root image P1 is displayed in the center of the touch screen 18.

When the root image P1 displayed on the touch screen 18 is touched by the finger f1 of the user in the state shown in FIG. 7A, the display on the touch screen 18 transitions to a state shown in FIG. 7C. As shown in FIG. 7C, images PA to PD in which classification items (narrowing-down conditions) are displayed are displayed, for example, at four corners of the root image P1. The images PA to PD in which the classification items are displayed are hereinafter referred to as classification tags PA to PD.

When the user touches, with the finger f1, a classification tag in which a classification item desired to be used for retrieval of a related image is displayed among the classification tags PA to PD, the user can select the classification item. Then, an image having a highest degree of strength of relation in the selected classification item among related images of the root image P1 is displayed on the touch screen 18 as a related image. The selection of a classification item can be performed not only by touching a classification tag with the finger f1 but also by stroking operation by the finger f1 in a certain direction of the classification tags PA to PD. In this embodiment, the classification item is selected by touching the classification tag with the finger f1.

Specification, for example, in the example shown in FIGS. 7A to 7E, as shown in FIG. 7D, since the classification tag PA in which "person" is displayed is touched by the finger f1, "person" is selected as a classification item. Then, as shown in FIG. 7E, an image P2 having strong relation concerning "person" with the root image P1, for example, the image P2 including the same person as in the root image P1 is displayed as a related image.

When the first example (FIGS. 3A to 3E) and the second example (FIGS. 7A to 7E) of the related image retrieval operation are compared, even in the first example, the user can search for a related image without a specific purpose. However, in the first example, since relationship with the root image P1 is not clearly shown, the first example is not suitable when the user searches for only an image having certain relationship.

On the other hand, in the second example, when a root image is touched, for example, the respective classification items are displayed around the root image. In the example shown in FIGS. 7A to 7E, the classification tags PA to PD are displayed. Therefore, when the user selects a desired classification items among the classification items, the user can display an image having strongest relation with the root image in the selected classification item as a related image. By adopting the second example in this way, the user can easily search for, for example, only an image in which a specific person is photographed.

FIG. 8 is a flowchart for explaining an example of related image retrieval processing corresponding to the second example of the related image retrieval operation explained with reference to FIGS. 7A to 7E, i.e., second related image retrieval processing.

In step S61, the CPU 23 determines whether a root image is selected.

When a root image is not selected, the CPU 23 determines in step S61 that a root image is not selected (NO in step S61) and returns the processing to step S61. In other words, until a root image is selected, the CPU 23 repeatedly executes the determination processing in step S61.

Thereafter, when a root image is selected, the CPU 23 determines in step S61 that a root image is selected (YES in step S61) and the processing proceeds to step S62.

In step S62, the CPU 23 controls the digital-signal processing unit 15 to display the root image on the touch screen 18. The root image can be displayed in an arbitrary area of the touch screen 18. However, it is advisable to display the root image in an area determined by taking into account display of classification items after that. For example, in the example shown in FIGS. 7A to 7E, as shown in FIG. 7A, the root image P1 is displayed in an area in the center of the touch screen 18.

In step S63, the CPU 23 determines whether an area in the root image on the touch screen 18 is touched.

When no area in the root image is touched, the CPU 23 determines in step S63 that no area in the root image is touched (NO in step S63) and returns the processing to step S63. In other words, until any area of the root image is touched, the CPU 23 repeatedly executes the determination processing in step S63.

Thereafter, when any area in the root image is touched, the CPU 23 determines in step S63 that an area in the root image is touched (YES in step S63) and the processing proceeds to step S64.

In step S64, the CPU 23 controls the digital-signal processing unit 15 to display classification tags at four corners of the root image on the touch screen 18. For example, in the example shown in FIGS. 7A to 7E, as shown in FIG. 7C, the classification tags PA to PD are displayed. In the example explained with reference to FIG. 8, display places of the classification tags are set at the four corners according to the example shown in FIGS. 7A to 7E. However, the display places are not limited to the example explained with reference to FIG. 8. A form for displaying the classification items is not limited to the classification tag as long as the classification items can be presented to the user.

In step S65, the CPU 23 determines whether a specific classification tag is touched among the classification tags displayed on the touch screen 18.

When none of the classification tags displayed on the touch screen 18 is touched, the CPU 23 determines in step S65 that none of the classification tags is touched (NO in step S65) and returns the processing to step S65. In other words, until any one of the classification tags displayed on the screen 18 is touched, the CPU 23 repeatedly executes the determination processing in step S65.

Thereafter, when a specific classification tag among the classification tags displayed on the touch screen 18 is touched, the CPU 23 determines in step S65 that the specific classification tag among the classification tags is touched (YES in step S65) and the processing proceeds to step S66.

In step S66, the CPU 23 retrieves, from all the images recorded in the recording device 19, a related image using a narrowing-down condition (a classification item) corresponding to the touched classification tag. In other words, in this embodiment, an image having a highest degree of strength of relation with the root image in the narrowing-down condition (the classification item) corresponding to the touched classification tag is retrieved as a related image.

In step S67, the CPU 23 controls the digital-signal processing unit 15 to display the retrieved related image on the touch screen 18.

For example, in the example shown in FIGS. 7A to 7E, as shown in FIG. 7D, when the finger f1 touches the classification tag PA, the CPU 23 determines in the processing in step S65 that a specific classification tag is touched (YES in step S65). In the processing in step S66, the CPU 23 retrieves, as the related image P2, an image having a highest degree of strength of relation concerning "person" with the root image P1. In the processing in step S67, the CPU 23 displays the related image P2 near an area where the classification tag PA of "person" is displayed. A display place of the related image P2 is not specifically limited to the example shown in FIGS. 7A to 7E and is arbitrary. However, by adopting the place in the example shown in FIGS. 7A to 7E, the user can easily recognize that the related image P2 is an image having high relationship concerning the classification item "person" indicated by the classification tag PA.

In step S68, the CPU 23 stores displayed image history information in the recording device 19.

Consequently, the second related image retrieval processing ends.

As in the example explained with reference to FIG. 4, in the processing in steps S67 and S68, the CPU 23 may determine whether the end of the processing is instructed, return the processing to an appropriate step unless the end of the processing is instructed, and advance the processing to step S68 only when the end of the processing is instructed.

The second example of the related image retrieval operation is explained above with reference to FIGS. 7A to 7E. The example of the second related image retrieval processing corresponding to the second example is explained above with reference to the flowchart of FIG. 8.

A third example of the related image retrieval operation is explained below with reference to FIGS. 9A to 9F. An example of third related image retrieval processing corresponding to the third example is explained with reference to a flowchart of FIG. 10.

First, in order to perform the related image retrieval operation, the user sets an operation state of the CPU 23 to an operation state in which the related image retrieval processing can be executed (hereinafter referred to as retrieval mode). Then, the display state of the touch screen 18 changes to a state shown in FIG. 9A. In other words, as shown in FIG. 9A, images Pa to Pd for selecting classification items (narrowing-down conditions) are displayed on the touch screen 18. The images Pa to Pd in which the classification items are displayed are referred to as classification item selection images Pa to Pd.

When the user touches, with the finger f1, a classification item image in which a classification item desired to be used for retrieval of a related image is displayed among the classification item images Pa to Pd, the user can select the classification item.

Thereafter, as in the second example, the user selects an arbitrary image as the root image P1. Selection operation itself is not specifically limited. When the root image P1 is selected, a display state of the touch screen 18 changes to a state shown in FIG. 9B. A state in which the root image P1 is displayed in the center of the touch screen 18 is shown in FIG. 9B.

In the state shown in FIG. 9B, when the root image P1 displayed on the touch screen 18 is touched by the finger f1 of the user, the display on the touch screen 18 transitions to a state shown in FIG. 9D1 or 9D2. When a classification item corresponding to the selected classification item image is represented as a main classification item (Main Key) and classification items (narrowing-down conditions) obtained by more finely classifying the main classification item are represented as sub-classification items (Sub-Key), classification tags PA1 to PD1 or PA2 to PD2 concerning the sub-classification items are displayed, for example, at four corners of the root image P1.

In the example shown in FIGS. 9A to 9F, since the finger f1 touches the classification item image Pa in the state shown in FIG. 9A, a main classification item "person" is selected.

As sub-classification items classified in terms of the size of a face in an image, for example, there are "extra large", "large", "medium", and "small". Therefore, a state in which a classification tag PC1 indicating "extra large", a classification tag PA1 indicating "large", a classification tag PB1 indicating "medium", and a classification tag PD1 indicating "small" are displayed at the four corners of the root image P1 is illustrated in FIG. 9D1.

Concerning "person", as sub-classification items classified in terms of the number of people included in an image, for example, there are "one person", "two people", "three people", and "four or more people". Therefore, a state in which a classification tag PC2 indicating "one person", a classification tag PA2 indicating "two people", a classification tag PB2 indicating "three people", and a classification tag PD2 indicating "four or more people" are displayed at the four corners of the root image P1 is illustrated in FIG. 9D2.

When the user touches, with the finger f1, a classification tag in which a sub-classification item desired to be used for retrieval of a related image among the classification tags PA1 to PD1 or PA2 to PD2 is displayed, the user can select the sub-classification item. Then, an image having a highest degree of strength of relation in the selected sub-classification item is displayed on the touch screen 18 as a related image.

Specifically, for example, in the example shown in FIGS. 9A to 9F, as shown in FIG. 9E, the classification tag PA1 in which "large" of "person" is displayed is touched by the finger f1. Therefore, "large" is selected as a sub-classification item. Then, as shown in FIG. 9F, an image P2 having strong relation concerning "large" of "person" with the root image P1, for example, an image P2 including, in the size of "large", a face of the same person as in the root image P1 is displayed as a related image.

As explained above, for example, when a related image is retrieved by using a main classification item, sub-classification items provided in terms of the size of a face of "person" shown in an image, the number of "persons" shown in the image, and the like are present. Since the user can designate these sub-classification items, the user can search for desired one image while limiting a composition to some extent.

FIG. 10 is a flowchart for explaining an example of related image retrieval processing corresponding to the third example of the related image retrieval operation explained with reference to FIGS. 9A to 9F, i.e., third related image retrieval processing.

In step S81, the CPU 23 determines whether an operation mode of the CPU 23 is set in the retrieval mode.

When the retrieval mode is not set, the CPU 23 determines in step S81 that the operation mode of the CPU 23 is not set in the retrieval mode (NO in step S81) and returns the processing to step S81. In other words, until the retrieval mode is set, the CPU 23 repeatedly executes the determination processing in step S81.

Thereafter, when a root image is selected, the CPU 23 determines in step S81 that the operation mode of the CPU 23 is set in the retrieval mode (YES in step S81) and the processing proceeds to step S82.

In step S82, the CPU 23 controls the digital-signal processing unit 15 to display classification item selection images on the touch screen 18. For example, in the example shown in FIGS. 9A to 9F, as shown in FIG. 9A, the classification item selection images Pa to Pd are displayed.

In step S83, the CPU 23 determines whether a specific classification item selection image among the classification item selection images displayed on the touch panel 16 is touched.

When none of the classification item selection images displayed on the touch screen 18 is touched, the CPU 23 determines in step S83 that none of the classification item selection screens is touched (NO in step S83) and returns the processing to step S83. In other words, until any one of the classification item selection images displayed on the touch screen 18 is touched, the CPU 23 repeatedly executes the determination processing in step S83.

Thereafter, when a specific classification item selection image among the classification item selection images displayed on the touch screen 18 is touched, the CPU 23 determines in step S83 that a specific classification item selection image is touched (YES in step S83) and the processing proceeds to step S84.

In step S84, the CPU 23 sets a main classification item corresponding to the touched classification item selection image.

For example, in the example shown in FIGS. 9A to 9F, since the finger f1 is brought into contact with the classification item image Pa in the state shown in FIG. 9A, the CPU 82 determines in the processing in step S83 that a specific classification item selection image is touched (YES in step S83). In the processing in step S84, the CPU 23 selects a main classification item "person".

In step S85, the CPU 23 determines whether a root image is selected.

When the root image is not selected, the CPU 23 determines in step S85 that a root image is not selected (NO in step S85) and returns the processing to step S85. In other words, until a root image is selected, the CPU 23 repeatedly executes the determination processing in step S85.

Thereafter, when a root image is selected, the CPU 23 determines in step S85 that a root image is selected (YES in step S85) and the processing proceeds to step S86.

In step S86, the CPU 23 controls the digital-signal processing unit 15 to display the root image on the touch screen 18. The root image can be displayed in an arbitrary area of the touch screen 18. Thereafter, it is advisable to display the root image in an area determined by taking into account display of sub-classification items after that. For example, in the example shown in FIGS. 9A to 9F, as shown in FIG. 9B, the root image P1 is displayed in the area in the center of the touch screen 18.

In step S87, the CPU 23 determines whether an area in the root image on the touch screen 18 is touched.

When no area in the root image is touched, the CPU 23 determines in step S87 that no area in the root image is touched (NO in step S87) and returns the processing to step S87. In other words, until any area of the root image is touched, the CPU 23 repeatedly executes the determination processing in step S87.

Thereafter, when any area in the root image is touched, the CPU 23 determines in step S87 that an area in the root image is touched (YES in step S87) and the processing proceeds to step S88.

In step S88, the CPU 23 controls the digital-signal processing unit 15 to display classification tags of sub-classification items at four corners of the root image on the touch screen 18. For example, in the example shown in FIGS. 9A to 9F, as shown in FIG. 9D1 or 9D2, the classification tags PA1 to PD1 or the classification tags PA2 to PD2 are displayed as classification tags of sub-classification items concerning "person". In the example explained with reference to FIG. 10, display places of the classification tags are set at the four corners according to the example shown in FIGS. 9A to 9F. However, the display places are not limited to the example explained with reference to FIG. 10. A form for displaying the classification items is not limited to the classification tag as long as the classification items can be presented to the user.

In step S89, the CPU 23 determines whether a specific classification tag is touched among the classification tags displayed on the touch screen 18.

When none of the classification tags displayed on the touch screen 18 is touched, the CPU 23 determines in step S89 that none of the classification tags is touched (NO in step S89) and returns the processing to step S89. In other words, until any one of the classification tags displayed on the screen 18 is touched, the CPU 23 repeatedly executes the determination processing in step S89.

Thereafter, when a specific classification tag among the classification tags displayed on the touch screen 18 is touched, the CPU 23 determines in step S89 that the specific classification tag among the classification tags is touched (YES in step S89) and the processing proceeds to step S90.

In step S90, the CPU 23 retrieves, from all the images recorded in the recording device 19, a related image using a narrowing-down condition (a sub-classification item) corresponding to the touched classification tag. In other words, in this embodiment, an image having a highest degree of strength of relation with the root image in the narrowing-down condition (the sub-classification item) corresponding to the touched classification tag is retrieved as a related image.

In step S91, the CPU 23 controls the digital-signal processing unit 15 to display the retrieved related image on the touch screen 18.

For example, in the example shown in FIGS. 9A to 9F, as shown in FIG. 9E, when the finger f1 touches the classification tag PA1, the CPU 23 determines in the processing in step S89 that a specific classification tag is touched (YES in step S89). In the processing in step S90, the CPU 23 retrieves, as the related image P2, an image having a highest degree of strength of relation with the root image P1 in terms of the size "large" of a face of "person". In the processing in step S91, the CPU 23 displays the related image P2 near an area where the classification tag PA1 of "large" is displayed. A display place of the related image P2 is not specifically limited to the example shown in FIGS. 9A to 9F and is arbitrary. However, by adopting the place in the example shown in FIGS. 9A to 9F, the user can easily recognize that the related image P2 is an image having high relationship concerning the sub-classification item "large" of the face of "person" indicated by the classification tag PA1.

In step S92, the CPU 23 stores displayed image history information in the recording device 19.

Consequently, the second related image retrieval processing ends.

The third example of the related image retrieval operation is explained with reference to FIGS. 9A to 9F. The example of the third related image retrieval processing corresponding to the third example is explained with reference to the flowchart of FIG. 10.

Figure 11:
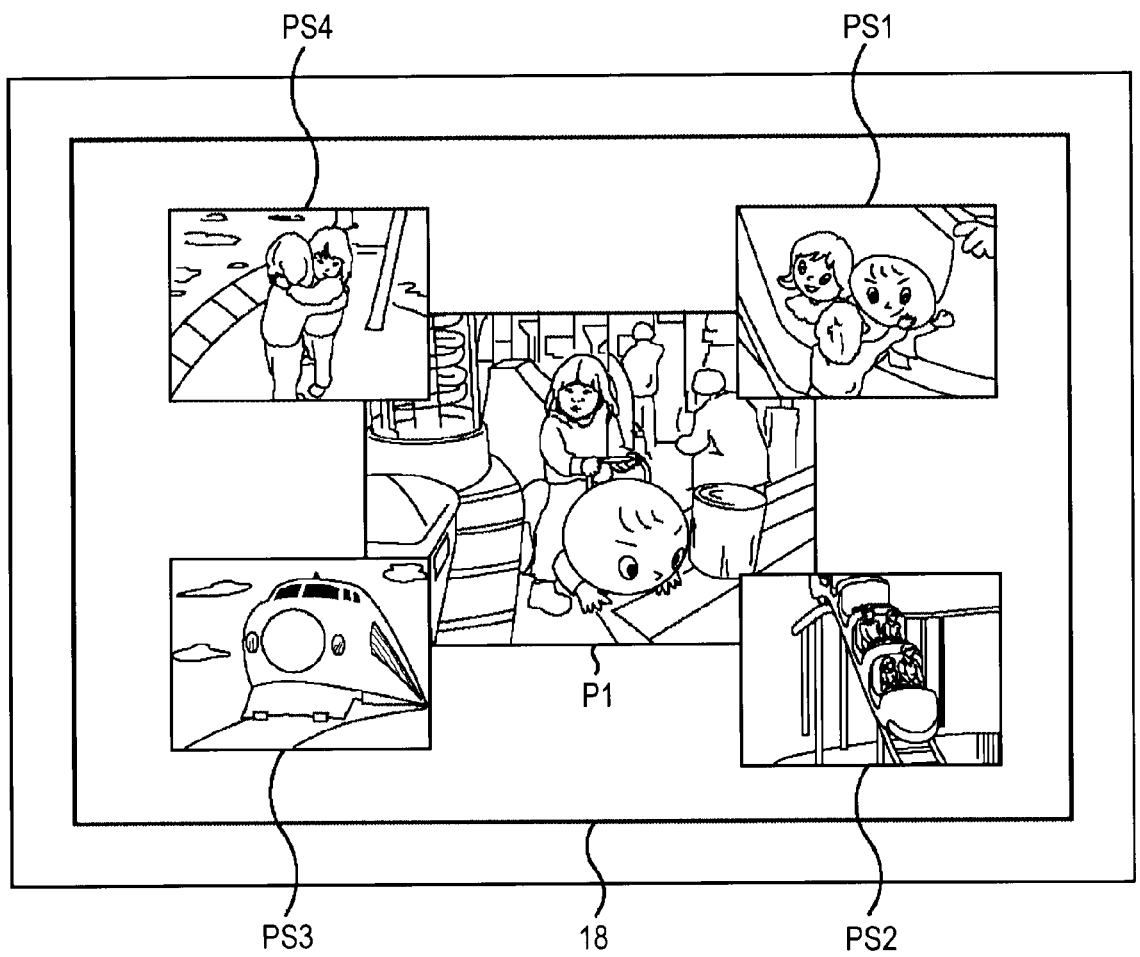
FIG. 11 is a diagram for explaining an example of a method of using thumbnail images as a method of presenting classification items.

In the second and third examples of the related image retrieval operation, the classification items are displayed at the four corners of the root image. However, as explained above, the number of classification items is not limited to four. It is not specifically necessary to limit a display form of the classification items to the display at four corners of an image. For example, as shown in FIG. 11, it is also possible to adopt, as a display form, a form of preparing, without displaying classification items using characters, thumbnail images PS1 to PS4 of a related image displayed by selecting the classification items and displaying the thumbnail images PS1 to PS4.

A fourth example of the related image retrieval operation is explained below with reference to FIGS. 12A to 12E. An example of fourth related image retrieval processing corresponding to the fourth example is explained with reference to flowcharts of FIGS. 13 to 15.

The second and third examples are the example in which the CPU 23 presents the classification items on the touch panel 16 and the user searches for a desired image group.

On the other hand, the fourth example is an example in which meaning is given to a place touched by the user (a place touched by the finger f1 of the user) on the touch panel 16.

As shown in FIG. 12A, when a predetermined area of the root image P1 is touched by the finger f1 in a state in which the root image P1 is displayed on the touch screen 18, the CPU 23 analyzes an image in a predetermined area and recognizes classification items from the image analysis.

A method of the image analysis itself is not specifically limited. However, it is assumed that a following method of an image analysis is employed in this embodiment. Specifically, it is assumed that plural classification items are set in advance as analysis candidates and priority is given to each of the plural analysis candidates in advance. Consequently, as an image analysis for a predetermined area, the plural analysis candidates (classification candidates) are analyzed in order of the priority. Specifically, when an analysis result of the image analysis is a result indicating that it is difficult to recognize that a specific identification object of the analysis candidates is not included in the predetermined area, the image analysis is performed again by using another analysis candidate of the next priority. A predetermined area in which it is difficult to recognize by all image analyses that the specific identification object is included is treated as not including an image having strong relation. In other words, an analysis result indicating that an analysis is difficult is obtained.

For example, when a predetermined area including a face in the root image P1 is touched, the CPU 23 analyzes an image of the predetermined area to recognize "person" as a classification item. Subsequently, the CPU 23 retrieves images having high degrees of relation concerning "person" with the root image P1 as related images P2B and P3B. As shown in FIG. 12B, the CPU 23 controls the digital-signal processing unit 15 to display the related images P2B and P3B on the touch screen 18. It goes without saying that display forms such as the displayed number of related images and a display place are not limited.

For example, when a predetermined area related to a place in the root image P1 is touched, the CPU 23 analyzes an image of the predetermined area to recognize "place" as a classification item. Subsequently, the CPU 23 retrieves images having high degrees of strength of relation concerning "place" with the root image P1 as related images P2C and P3C. As shown in FIG. 12C, the CPU 23 controls the digital-signal processing unit 15 to display the related images P2C and P3C on the touch screen 18. It goes without saying that display forms such as the displayed number of related images and a display place are not limited.

For example, when a predetermined area in which a specific color is dominant in the root image P1 is touched, the CPU 23 analyzes an image of the predetermined area to recognize "color" as a classification item. Subsequently, the CPU 23 retrieves images having high degrees of strength of relation concerning "color" with the root image P1 as related images P2D and P3D. As shown in FIG. 12D, the CPU 23 controls the digital-signal processing unit 15 to display the related images P2D and P3D on the touch screen 18. It goes without saying that display forms such as the displayed number of related images and a display place are not limited.

When the entire root image P1 is touched, the CPU 23 analyzes an image of the entire root image P1 and retrieves related images P2E and P3E on the basis of a result of the analysis. As shown in FIG. 12E, the CPU 23 controls the digital-signal processing unit 15 to display the related images P2E and P3E on the touch screen 18. It goes without saying that display forms such as the displayed number of related images and a display place are not limited. As a method of operation for touching an entire root image, a method of performing stroking operation to surround the root image P1 or a method of bringing plural fingers into contact with the root image P1 can be adopted.

FIG. 13 is a flowchart for explaining an example of related image retrieval processing corresponding to the fourth example of the related image retrieval operation explained with reference to FIGS. 12A to 12E, i.e., fourth related image retrieval processing.

In step S101, the CPU 23 determines whether a root image is selected.

When a root image is not selected, the CPU 23 determines in step S101 that a root image is not selected (NO in step S101) and returns the processing to step S101. In other words, until a root image is selected, the CPU 23 repeatedly executes the determination processing in step S61.

Thereafter, when a root image is selected, the CPU 23 determines in step S101 that a root image is selected (YES in step S101) and the processing proceeds to step S102.

In step S102, the CPU 23 controls the digital-signal processing unit 15 to display the root image on the touch screen 18. The root image can be displayed in an arbitrary area of the touch screen 18. However, it is advisable to display the root image in an area determined by taking into account image analyses after that. For example, in the example shown in FIGS. 12A to 12E, as shown in FIG. 12A, the root image P1 is displayed in a large size in an area in the center of the touch screen 18 to allow the user to touch various areas in the root image P1 with the finger f1.

In step S103, the CPU 23 determines whether an area in the root image on the touch screen 18 is touched.

When no area in the root image is touched, the CPU 23 determines in step S103 that no area in the root image is touched (NO in step S103) and returns the processing to step S103. In other words, until any area in the root image is touched, the CPU 23 repeatedly executes the determination processing in step S103.

Thereafter, when any area in the root image is touched, the CPU 23 determines in step S103 that an area in the root image is touched (YES in step S103) and the processing proceeds to step S104.

In step S104, the CPU 23 determines whether operation for touching the entire root image is performed.

When the operation for touching the entire root image is performed, the CPU 23 determines in step S104 that the operation for touching the entire root image is performed (YES in step S104) and the processing proceeds to step S106. In step S106, the CPU 23 analyzes the entire root image, retrieves a related image on the basis of a result of the analysis, and causes the touch screen 18 to display the related image. However, when a related image is not retrieved, an indication that there is no related image is displayed on the touch screen 18. Such processing in step S106 is hereinafter referred to as image analysis and retrieval processing. A detailed example of the image analysis and retrieval processing is explained later with reference to a flowchart of FIG. 15. When the image analysis and retrieval processing ends, the processing proceeds to step S111. In step S111, the CPU 23 stores displayed image history information in the recording device 19. Consequently, the fourth related image retrieval processing ends.

On the other hand, when operation for touching a predetermined area of the root image is performed, the CPU 23 determines in step S104 that the operation for touching the entire root image is not performed (NO in step S104) and the processing proceeds to step S105. In step S105, the CPU 23 analyzes an image of the predetermined area and, as a result of the analysis, outputs a predetermined analysis candidate among plural analysis candidates as a classification item. However, when it is difficult to output any one of the plural analysis candidates, the CPU 23 outputs an analysis result "no related image". Such processing in step S105 is hereinafter referred to as image analysis processing by contact area. A detailed example of the image analysis processing by contact area is explained later with reference to a flowchart of FIG. 14.

When the image analysis processing by contact area in step S105 ends and a result of the analysis is output, the processing proceeds to step S107.

In step S107, the CPU 23 determines whether the analysis result is "no related image".

When the analysis result is "no related image", the CPU 23 determines in step S107 that the analysis result is "no related image" (YES in step S107) and the processing proceeds to step S108. In step S108, the CPU 23 controls the digital-signal processing unit 15 to display an indication that there is no related image on the touch screen 18. Consequently, the fourth related image retrieval processing ends.

On the other hand, when the analysis result is a predetermined classification item, the CPU 23 determines in step S107 that the analysis result is "no related image" (NO in step S107) and the processing proceeds to step S109.

In step S109, the CPU 23 retrieves a related image using the analysis result (the predetermined classification item) as a narrowing-down condition. In this embodiment, an image having a high degree of strength of relation with the root image in the analysis result (the narrowing-down condition) is retrieved as a related image.

In step S110, the CPU 23 controls the digital-signal processing unit 15 to display the retrieved related image on the touch screen 18.

For example, in the example shown in FIGS. 12A to 12E, when the analysis result is "person", in the processing in step S109, the CPU 23 retrieves images having high degrees of strength of relation concerning "person" with the root image P1 are retrieved as related images P2B and P3B. In the processing in step S110, the CPU 23 displays the related images P2B and P3B.

For example, when the analysis result is "place", in the processing in step S109, the CPU 23 retrieves images having high degrees of strength of relation concerning "place" with the root image P1 as related images P2C and P3C. In the processing in step S110, the CPU 23 displays the related images P2C and P3C.

For example, when the analysis result is "color", in the processing in step S109, the CPU 23 retrieves images having high degrees of strength of relation concerning "color" with the root image P1 as related images P2D and P3D. In the processing in step S110, the CPU 23 displays the related images P2D and P3D.

In step S111, the CPU 23 stores displayed image history information in the recording device 19.

Consequently, the fourth related image retrieval processing ends.

Figure 14:
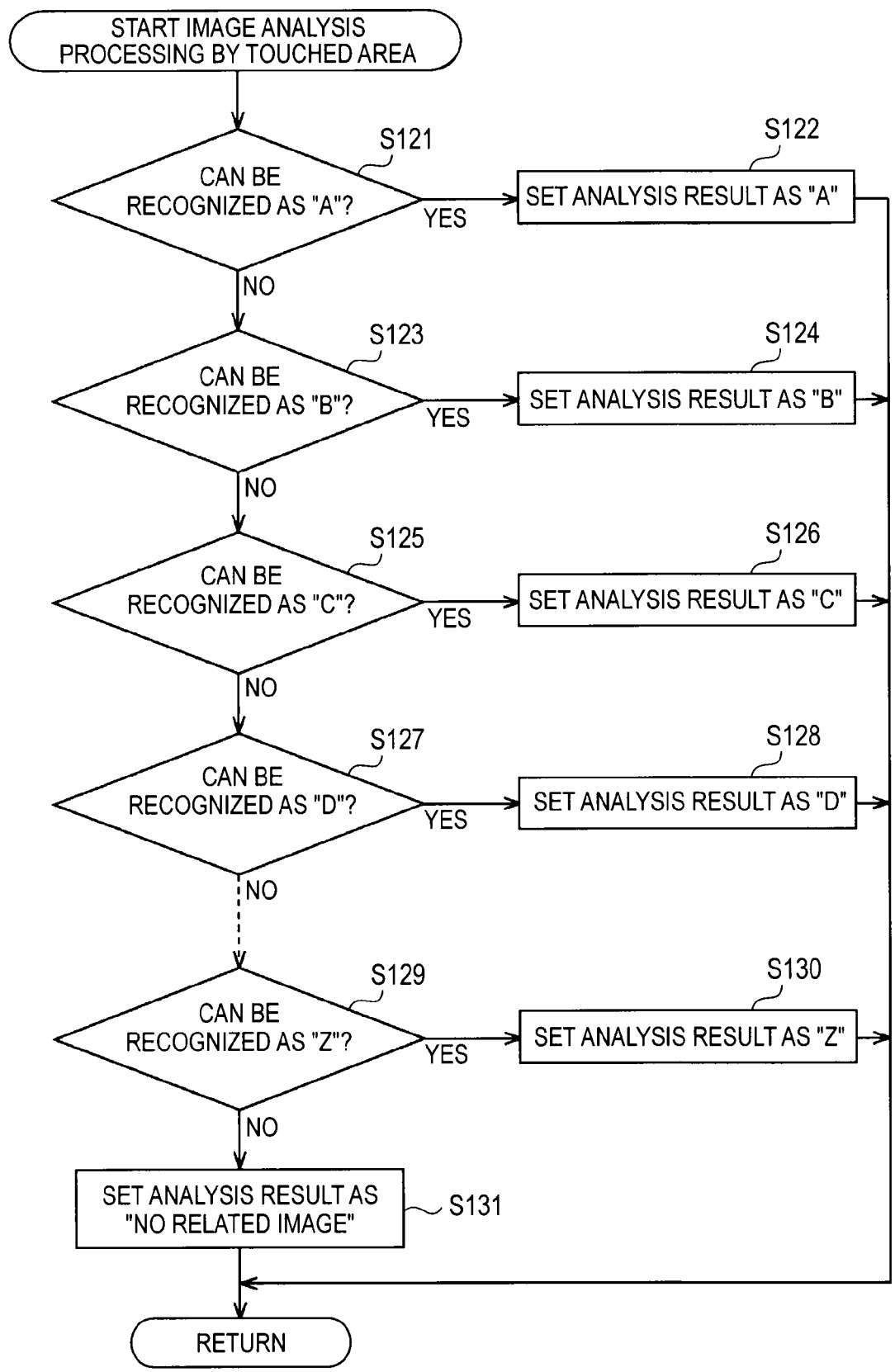
FIG. 14 is a flowchart for explaining a detailed example of image analyzing processing by contact area in step S65 of the fourth related image retrieval processing.

A detailed example of the image analysis processing by contact area in step S105 of the fourth related image retrieval processing is explained with reference to a flowchart in FIG. 14.

As explained above, it is assumed that plural classification items A to Z are set in advance as analysis candidates and priority is given to each of the plural analysis candidates A to Z in that order in advance. The classification items A to Z do not mean that twenty-six kinds of classification items are present as indicated by alphabets. The classification item Z indicates a classification item of a kind with lowest priority among two or a larger arbitrary number of kinds.

The classification items A to Z are not specifically limited. However, if the classification items A to Z are associated with the example shown in FIGS. 12A to 12E, it is assumed that at least "person", "place", and "color" are included in the classification items A to Z. Besides, a specific object, a specific composition, and the like can also be included in the classification items A to Z.

As explained above, when the operation for touching a predetermined area of the root image is performed, the CPU 23 determines in step S104 that the operation for touching the entire root image is not performed (NO in step S104) and executes processing explained below as the image analysis processing by contact area in step S105.

In step S121, the CPU 23 analyzes an image of the predetermined area to determine whether a classification item of the predetermined area can be recognized as "A".

When the CPU 23 determines in step S121 that the classification item of the predetermined area can be recognized as "A", in step S122, the CPU 23 sets an analysis result as "A". Consequently, the image analysis processing by contact area in step S105 in FIG. 13 ends and the processing proceeds to step S107.

On the other hand, when the CPU 23 determines in step S121 that it is difficult to recognize the classification item of the predetermined area as "A", the CPU 23 proceeds to step S123.

In step S123, the CPU 23 analyzes an image of the predetermined area to determine whether the classification item of the predetermined area can be recognized as "B".

When the CPU 23 determines in step S123 that the classification item of the predetermined area can be recognized as "B", in step S124, the CPU 23 sets an analysis result as "B". Consequently, the image analysis processing by contact area in step S105 in FIG. 13 ends and the processing proceeds to step S107.

On the other hand, when the CPU 23 determines in step S123 that it is difficult to recognize the classification item of the predetermined area as "B", the processing proceeds to step S125.

In step S125, the CPU 23 analyses the image of the predetermined area to determine whether the classification item of the predetermined area can be recognized as "C".

When the CPU 23 determines in step S125 that the classification item of the predetermined area can be recognized as "C", in step S124, the CPU 23 sets an analysis result as "C". Consequently, the image analysis processing by contact area in step S105 in FIG. 13 ends and the processing proceeds to step S107.

On the other hand, when the CPU 23 determines in step S125 that it is difficult to recognize the classification item of the predetermined area as "C", the processing proceeds to step S127.

In step S127, the CPU 23 analyzes the image of the predetermined area to determine whether the classification item of the predetermined area can be recognized as "D".

When the CPU 23 determines in step S127 that the classification item of the predetermined area can be recognized as "D", in step S128, the CPU 23 sets an analysis result as "D". Consequently, the image analysis processing by contact area in step S105 in FIG. 13 ends and the processing proceeds to step S107.

On the other hand, when the CPU 23 determines in step S127 that it is difficult to recognize the classification item of the predetermined area as "D", the CPU 23 repeats the same processing for "E" to "Y". Specifically, when the CPU 23 determines that the classification item of the predetermined area can be recognized as predetermined one analysis candidate among "E" to "Y", the CPU 23 sets the analysis candidate as an analysis result.

On the other hand, when the CPU 23 determines that it is difficult to recognize the classification item of the predetermined area as any of "E" to "Y", the processing proceeds to step S129. In step S129, the CPU 23 analyzes the image of the predetermined area to determine whether the classification item of the predetermined area can be recognized as "Z".

When the CPU 23 determines in step S129 that the classification item of the predetermined area can be recognized as "Z", in step S130, the CPU 23 sets an analysis result as "Z". Consequently, the image analysis processing by contact area in step S105 of FIG. 13 ends and the processing proceeds to step S107.

On the other hand, when the CPU 23 determines in step S129 that it is difficult to recognize the classification item of the predetermined area as "Z", in step S131, the CPU 23 sets an analysis result as "no related image". Consequently, the image analysis processing by contact area in step S105 of FIG. 13 ends and the processing proceeds to step S107.

The detailed example of the image analysis processing by contact area in step S105 of the fourth related image retrieval processing is explained above with reference to the flowchart of FIG. 14.

Figure 15:
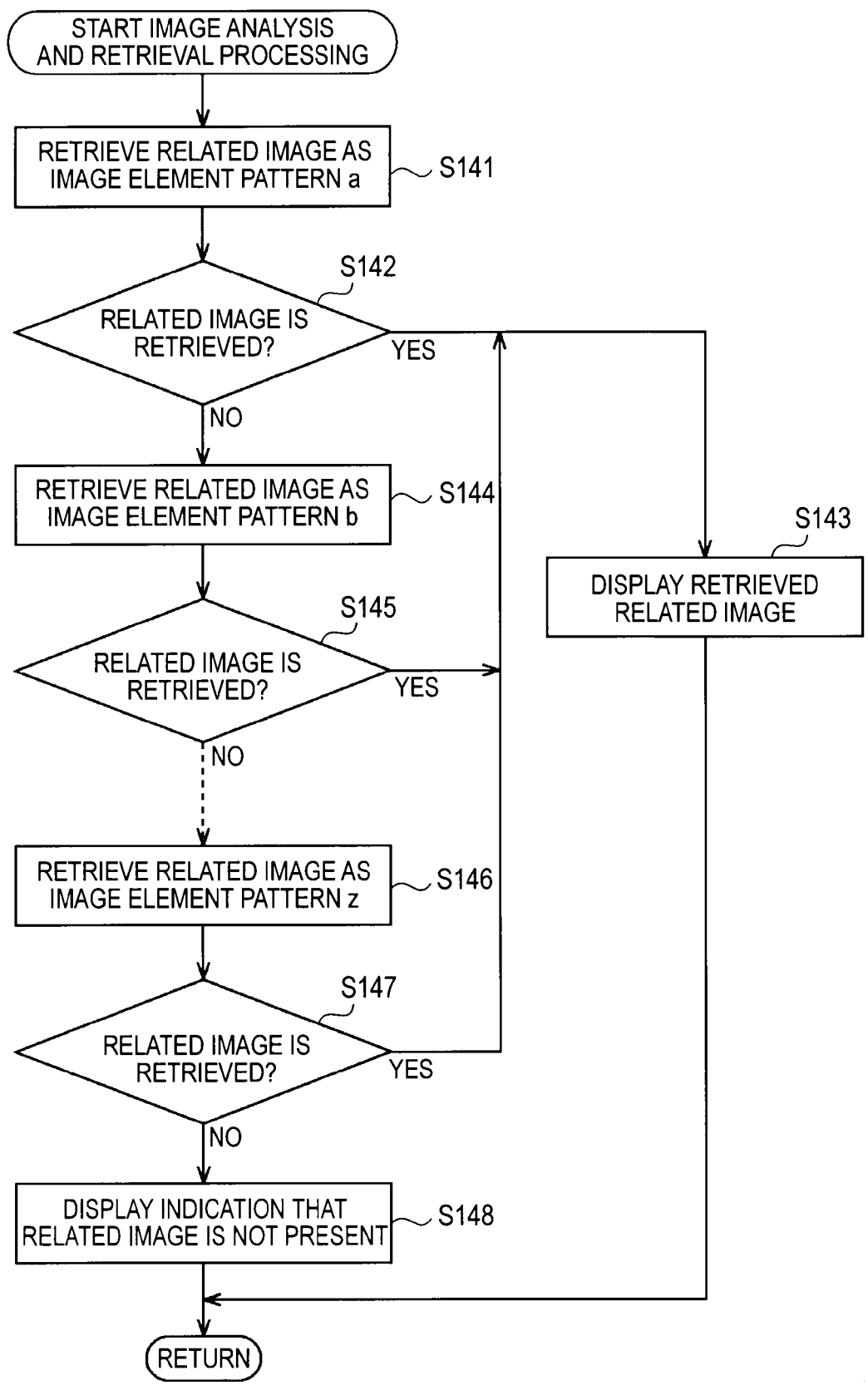
FIG. 15 is a flowchart for explaining a detailed example of image analysis and retrieval processing in step S66 of the fourth related image retrieval processing.

A detailed example of the image analysis and retrieval processing in step S106 of the fourth related image retrieval processing is explained below with reference to a flowchart of FIG. 15.

As a premise of the example explained with reference to FIG. 15, an image element pattern is used. The image element pattern is a predetermined pattern of elements forming an image and is an index used for comparison concerning whether two images are in a relation of related images. For example, various patterns such as a pattern in which people are shown, a pattern in which the numbers of people shown in images are the same, a pattern in which only scenery is shown, and a pattern in which photographing months and dates (excluding years) of images are the same can be adopted as the image element pattern.

In this case, the CPU 23 analyzes a root image and a related image candidate and determines whether image element patterns thereof coincide with each other. This determination processing is executed on all images that can be related image candidates. The CPU 23 retrieves a related image candidate, an image element pattern of which coincides with that of the root image, as a related image. Such a series of processing is hereinafter represented as "retrieving a related image as an image element pattern".

In the example explained with reference to FIG. 15, plural image element patterns "a" to "z" are set in advance and priority is given to each of the plural image element patterns "a" to "z" in advance in that order. The image element patterns "a" to "z" do not mean that twenty-six image element patterns are present as indicated by alphabets. Specifically, the image element pattern "z" indicates an image element pattern of a kind with lowest priority among two or a larger arbitrary number of kinds.

As explained above, when operation for touching the entire root image is performed, the CPU 23 determines in step S104 that the operation for touching the entire root image is performed (YES in step S104) and executes processing explained below as the image analysis and retrieval processing in step S106.

In step S141, the CPU 23 retrieves a related image as the image element pattern "a".

In step S142, the CPU 23 determines whether a related image is retrieved.

When an image, the image element pattern "a" of which coincides with that of the root image, is present in the recording device 19 and the image is retrieved as a related image, the CPU 23 determines in step S142 that a related image is retrieved (YES in step S142) and the processing proceeds to step S143.

In step S143, the CPU 23 controls the digital-signal processing unit 15 to display the retrieved related image on the touch screen 18. Consequently, the image analysis and retrieval processing in step S106 in FIG. 13 ends and the processing proceeds to step S111.

On the other hand, when an image, the image element pattern "a" of which coincides with that of the root image, is not present in the recording device 19, the CPU 23 determines in step S142 that a related image is not retrieved (NO in step S142) and the processing proceeds to step S144.

In step S144, the CPU 23 retrieves a related image as the image element pattern "b".

In step S145, the CPU 23 determines whether a related image is retrieved.

When an image, the image element pattern "b" of which coincides with that of the root image, is present in the recording device 19 and the image is retrieved as a related image, the CPU 23 determines in step S145 that a related image is retrieved (YES in step S145) and the processing proceeds to step S143.

In step S143, the CPU 23 controls the digital-signal processing unit 15 to display the retrieved related image on the touch screen 18. Consequently, the image analysis and retrieval processing in step S106 in FIG. 13 ends and the processing proceeds to step S111.

On the other hand, when an image, the image element pattern "b" of which coincides with that of the root image, is not present in the recording device 19, the CPU 23 determines in step S145 that a related image is not retrieved (NO in step S145). The same processing is repeated for the image element patterns "c" to "y".

When an image, a predetermined pattern among the image element patterns "c" to "y" of which coincides with that of the root image, is present in the recording device 19 and the image is retrieved as a related image, the processing proceeds to step S143.

In step S143, the CPU 23 controls the digital-signal processing unit 15 to display the retrieved related image on the touch screen 18. Consequently, the image analysis and retrieval processing in step S106 in FIG. 13 ends and the processing proceeds to step S111.

On the other hand, when an image, any one of the image element patterns "c" to "y" of which coincides with that of the root image, is not present in the recording device 19, the processing proceeds to step S146.

In step S146, the CPU 23 retrieves a related image as the image element pattern "z".

In step S147, the CPU 23 determines whether a related image is retrieved.

When an image, the image element pattern "z" of which coincides with that of the root image, is present in the recording device 19 and the image is retrieved as a related image, the CPU 23 determines in step S147 that a related image is retrieved (YES in step S147) and the processing proceeds to step S143.

In step S143, the CPU 23 controls the digital-signal processing unit 15 to display the retrieved related image on the touch screen 18. Consequently, the image analysis and retrieval processing in step S106 of FIG. 13 ends and the processing proceeds to step S111.

On the other hand, when an image, the image element pattern "z" of which coincides with that of the root image, is not present in the recording device 19, the CPU 23 determines in step S147 that a related image is not retrieved (NO in step S147) and the processing proceeds to step S148.

In step S148, the CPU 23 controls the digital-signal processing unit 15 to display an indication that there is no related image on the touch screen 18. Consequently, the image analysis and retrieval processing in step S106 in FIG. 13 ends and the processing proceeds to step S111.

The fourth embodiment of the related image retrieval operation according to this embodiment is explained above with reference to FIGS. 12A to 12E. The example of the fourth related image retrieval processing corresponding to the fourth embodiment is explained above with reference to the flowcharts of FIGS. 13 to 15.

In the example explained above, a root image (a still image or a moving image) is adopted as an image serving as a root. The operation based on a rule for searching for, with an image related to the root image set as a related image, the related image is adopted as the related image retrieval operation.

The operation conforming to the rule for searching for, with a certain image set as a root, images related to the root (hereinafter referred to as related retrieval operation) can be applied to, for example, display operation for a GUI context menu and the like installed in a Music Player or a Disc Server apparatuses besides the related image retrieval operation.

Figure 16:
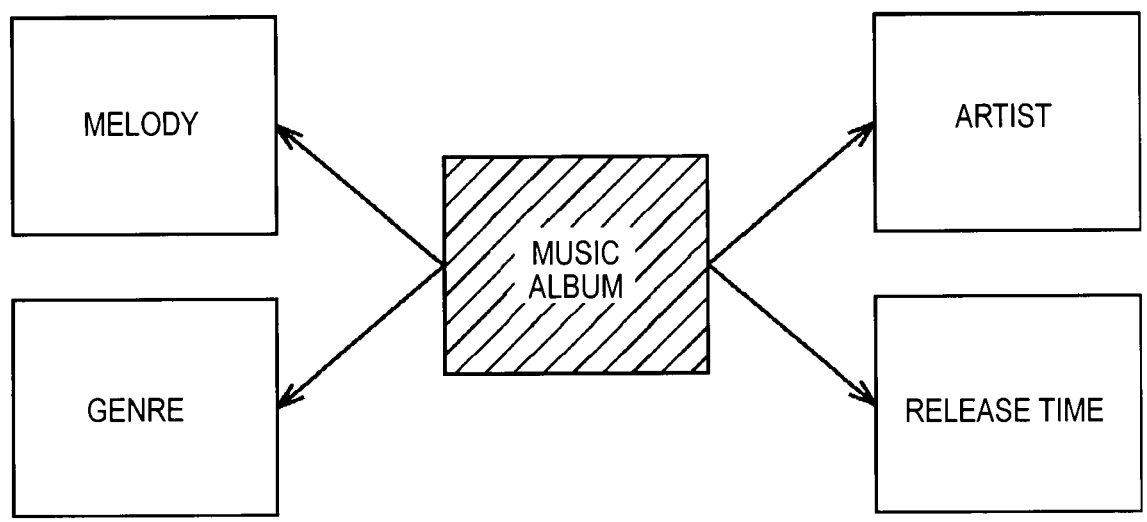
FIG. 16 is a diagram for explaining an example of related menu retrieval operation of the imaging apparatus.

For example, FIG. 16 is a diagram for explaining an operation example of the related retrieval operation applied to display operation for the GUI context menu installed in Music Player. Specifically, FIG. 16 is a diagram for explaining an example of operation for, with a GUI context menu displayed as "Music Album" set as a root (hereinafter referred to as root menu), searching for a GUI context menu related to the root menu (hereinafter referred to as related menu) (hereinafter referred to as related menu retrieval operation). A GUI context menu displayed as "melody" is used for a twelve-scale melody analysis and the like. A GUI context menu displayed as "Genre" is used for information such as an ID3 tag.

Figure 17:
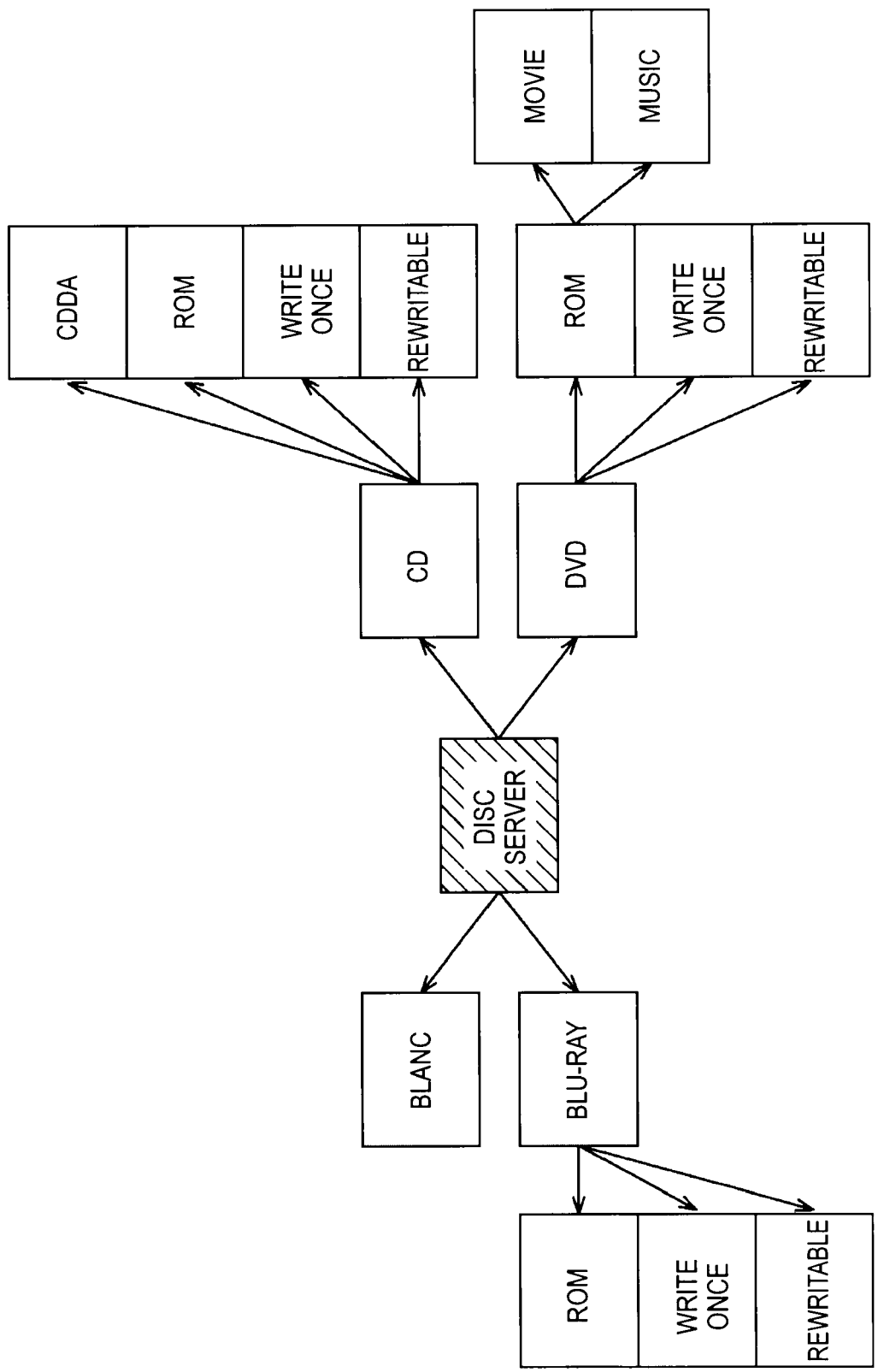
FIG. 17 is a diagram for explaining another example of the related menu retrieval operation of the imaging apparatus.

For example, FIG. 17 is a diagram for explaining an operation example of the related retrieval operation applied to display operation for a GUI context menu installed in the Disc Server apparatus. Specifically, FIG. 17 is a diagram for explaining an example of related menu retrieval operation for searching for, with respect to a displayed root menu "Disc Server", a related menu of the root menu.

The various kinds of related image retrieval operation and the respective kinds of related image retrieval processing corresponding thereto are explained above.

As explained above, the related image retrieval operation is operation that allows the user to search for related images one after another with intuitive operation without providing special retrieving means. The related image retrieval operation can be applied to the operation for searching for a related image without a specific purpose as in the first example and can be applied to the purpose of retrieving desired one image as in the second to fourth examples. In particular, in the third example, it is possible to easily search for and retrieve a related image even concerning a classification that is so abstract that the user does not easily imagine as a search word. A method of applying arbitrary operation to a final point of a searched related image (a related image searched last) to check a history of search and a retrieval history can also be realized. Re-search and re-retrieval of a related image can be easily performed by such a method.

A fifth example of the related image retrieval operation is explained below with reference to FIGS. 18A to 18C. An example of fifth related image retrieval processing corresponding to the fifth example is explained with reference to a flowchart of FIG. 19.

Figure 18A:
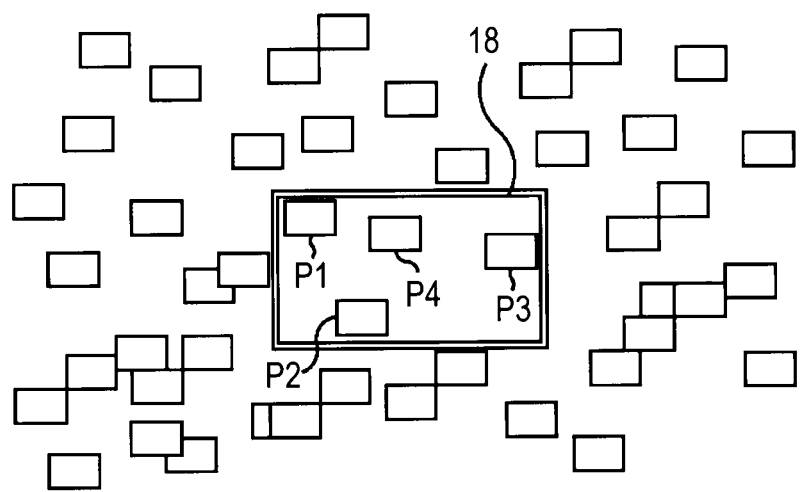
FIGS. 18A to 18C are diagrams for explaining a fifth example of the related image retrieval operation method of the imaging apparatus.
Figure 18B:
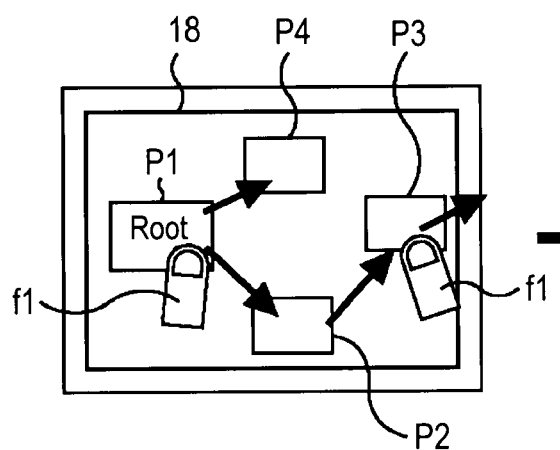

As shown in FIG. 18A, as a premise, it is assumed that all image groups are images that scatter on a desktop having an infinite space size and a part of the desktop is typically displayed on the touch screen 18.

It is assumed that operation basically the same as that in the first example is adopted as the related image retrieval operation itself. Plural related images are searched for by plural kinds of stroking operation. Specifically, as shown in FIG. 18B, when stroking operation is performed for the first time starting from the root image P1, the related images P2 and P4 are displayed on the touch screen 18 anew in a position where the stroking operation performed for the first time ends, i.e., a position where the finger f1 is released. When the user further performs stroking operation for the second time starting from a related image displayed anew, for example, the related image P2, the related image P3 is displayed on the touch screen 18 anew in a position where the stroking operation performed for the second time ends, i.e., a position where the finger f1 is released.

In this case, the related image P3 displayed anew is displayed at the right end of the touch screen 18. If the user attempts to perform the stroking operation for the second time starting from the related image P2 further in the right direction, an end position of the stroking operation is outside a display area. Therefore, it is difficult to display the related image P3 in the position where the stroking operation performed for the second time ends, i.e., the position where the finger f1 is released.

However, in the fifth example, as shown in FIG. 18A, as a premise, all the image groups scatter on the desktop having the infinite space size. Therefore, originally, it is possible to perform the stroking operation in any place. Nevertheless, the stroking operation is difficult only because the display size of the touch screen 18 is finite.

Therefore, in the fifth embodiment, an area displayed on the touch screen 18 of the desktop having the infinite space size is defined as a display area. Under this definition, the CPU 23 displays a new related image retrieved by operation for searching for a related image (stroking operation performed for plural times) on the touch screen 18, the CPU 23 executes processing explained below. When the CPU 23 determines that the new related image does not fit in a display area currently displayed, the CPU 23 executes shift processing for automatically shifting the display area such that the new related image is displayed in the center of the touch screen 18. When the CPU 23 determines that the new related image fits in the display area currently displayed, the CPU 23 prohibits the shift processing.

Figure 18C:
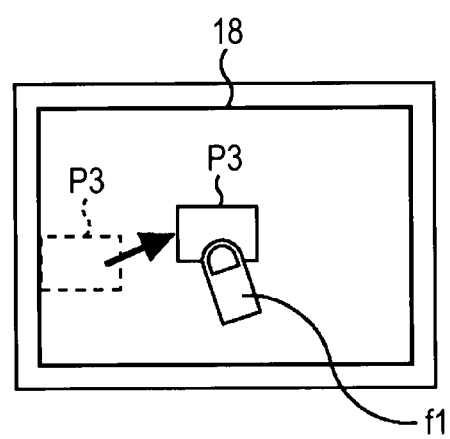

According to such shift processing, when the user attempts to perform the stroking operation for the second time outside the display area starting from the related image P2, a new related image P3 is, as indicated in FIG. 18C, displayed in a position in the center of the touch screen 18 (a position indicated by a solid line) rather than a position where the finger f1 is released (a position indicated by a dotted line).

FIG. 19 is a flowchart for explaining an example of related image retrieval processing corresponding to the fifth example of the related image retrieval operation explained with reference to FIGS. 18A to 18C, i.e., fifth related image retrieval processing.

In step S161, the CPU 23 determines whether a root image is selected.

When a root image is not selected, the CPU 23 determines in step S161 that a root image is not selected (NO in step S161) and returns the processing to step S161. In other words, until a root image is selected, the CPU 23 repeatedly executes the determination processing in step S161.

Thereafter, when a root image is selected, the CPU 23 determines in step S161 that a root image is selected (YES in step S161) and the processing proceeds to step S162.

In step S162, the CPU 23 controls the digital-image processing unit 15 to shift the display area such that the root image is displayed in the center of the touch screen 18. In other words, the root image is displayed in the center of the touch screen 18.

In step S163, the CPU 23 determines whether an area in the root image on the touch screen 18 is touched.

When no area in the root image is touched, the CPU 23 determines in step S163 that an area in the root image is not touched (NO in step S163) and returns the processing to step S163. In other words, until any area in the root image is touched, the CPU 23 repeatedly executes the determination processing in step S163.

Thereafter, when any area in the root image is touched, the CPU 23 determines in step S163 that an area in the root image is touched (YES in step S163) and the processing proceeds to step S164.

In step S164, the CPU 23 determines whether stroking operation is performed starting from the root image.

When the stroking operation is not performed, the CPU 23 determines in step S164 that the stroking operation is not performed (NO in step S164), returns the processing to step S164, and repeatedly executes the processing in step S164 and subsequent steps. In other words, until the stroking operation is performed, the CPU 23 repeatedly executes the determination processing in step S164.

Thereafter, when the stroking operation is performed, the CPU 23 determines in step S164 that the stroking operation is performed (YES in step S164) and the processing proceeds to step S165.

In step S165, the CPU 23 retrieves a related image from all the images recorded in the recording device 19.

In step S166, the CPU 23 determines whether the finger f1 is released from the touch screen 18, i.e., whether the stroking operation ends.

When the stroking operation does not end, the CPU 23 determines in step S166 that the finger f1 is not released from the touch screen 18 (NO in step S166), returns the processing to step S166, and repeatedly executes the processing in step S166 and subsequently steps. The CPU 23 repeatedly executes the determination processing in step S166 as long as the stroking operation is continued.

Thereafter, when the stroking operation ends, the CPU 23 determines in step S166 that the finger f1 is released from the touch screen 18 (YES in step S166) and the processing proceeds to step S167.

In step S167, the CPU 23 displays the related image in a position where the finger f1 is released on a virtual desktop.

What should be noted is that the related image is displayed on the virtual desktop rather than on the touch screen 18. In other words, when the position where the finger f1 is released on the virtual desktop is a position outside the display area, at a point of the processing in step s167, the related image is not displayed on the touch screen 18.

In step S168, the CPU 23 stores displayed image history information in the recording device 19.

In step S169, the CPU 23 determines whether the related image can be displayed on the touch screen 18.

As explained above, when the position where the finger f1 is released on the virtual desktop is a position outside the display area, if this state is not changed, it is difficult to display the related image on the touch screen 18. Therefore, in such a case, the CPU 23 determines in step S169 that the related image can not be displayed on the touch screen 18 (NO in step S169) and the processing proceeds to step S170.

In step S170, the CPU 23 controls the digital-signal processing unit 15 to shift the display area such that the related image is displayed in the center of the touch screen 18. In other words, the related image is displayed in the center of the touch screen 18. For example, in the example shown in FIGS. 18A to 18C, as shown in FIG. 18C, the related image P3 is displayed in the center of the touch screen 18. Thereafter, the processing proceeds to step S171. However, processing in step S171 and subsequent steps is explained later.

On the other hand, when the position where the finger f1 is released on the virtual desktop is a position inside the display area, it is possible to display the related image on the touch screen 18 without changing the state. Therefore, in such a case, the CPU 23 determines in step S169 that the related image can be displayed on the touch screen 18 and does not execute the processing in step S170. The processing proceeds to step S131.

In step S171, the CPU 23 determines whether the end of the processing is instructed.

Unless the end of the processing is instructed, the CPU 23 determines in step S171 that the end of the processing is not instructed (NO in step S171), returns the processing to step S163, and repeats the processing in step S163 and subsequent steps. Specifically, every time the stroking operation is performed, loop processing of YES in step S163, YES in step S164, S165, YES in step S166, S167, S168, YES in step S169/NO in step S169, S170, and NO in step S171 is repeatedly executed and a new related image is displayed in the center of the touch screen 18. The user can repeatedly execute the loop processing by repeating the stroking operation as if the user searches for a related image. Such a related image is typically shifted to the center of the touch screen 18.

Thereafter, when the end of the processing is instructed, the CPU 23 determines in step S171 that the end of the processing is instructed (YES in step S171) and finishes the fifth related image retrieval processing.

In this way, in the fifth related image retrieval processing, the CPU 23 automatically shifts the display area in the touch screen 18 having a physically limited size such that an image having highest priority of reproduction by the user (a new related image) is always displayed in the center of the touch screen 18. Consequently, it is possible to reproduce a large number of images without spoiling the sizes of the images irrespective of the display size of the touch screen 18. It is also possible to cause the user to undergo an experience of searching for a related image on the desktop having the infinite size. As a result, not only the image presenting method in the past for arranging images in a matrix shape but also an image presenting method for allowing the user to arrange images as the user likes and then view the images can be adopted.

The fifth example of the related image retrieval operation is explained above with reference to FIGS. 18A to 18C. The example of the fifth related image retrieval processing corresponding to the fifth embodiment is explained above with reference to the flowchart of FIG. 19.

In the fifth embodiment, when a new related image retrieved by the operation for searching for a related image (the stroking operation performed for plural times) is displayed on the touch screen 18, the shift processing in the display area is prohibited when it is determined that the related image fits in the display area currently displayed. For example, in an example shown in FIGS. 20A to 20C, it is assumed that the related image P4 is a new related image. In this case, as shown in FIG. 20A, the new related image P4 is not displayed in the center of the touch screen 18 and is displayed in a position where the finger f1 is released.

Figure 20A:
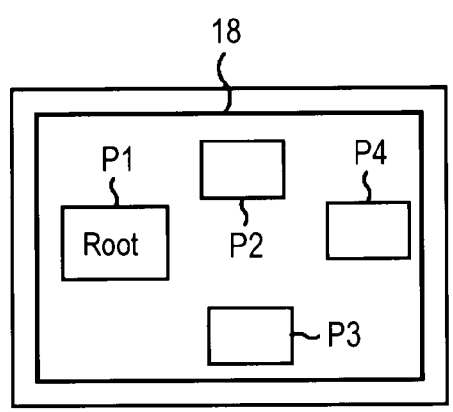
FIGS. 20A to 20C are diagrams for explaining an example of an operation method involved in enlarged/reduced image display processing.
Figure 20B:
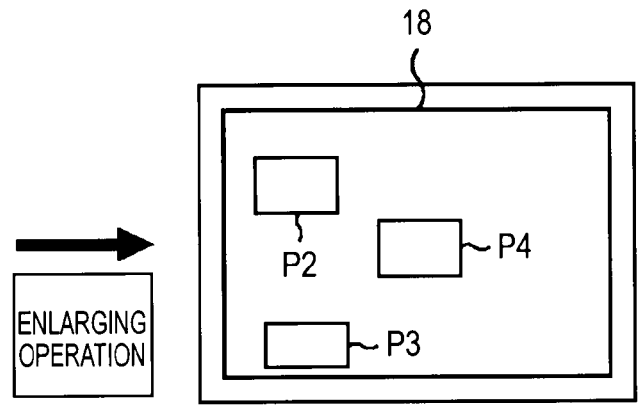

In such a state shown in FIG. 20A, for example, when a present display area is enlarged or reduced by operation such as a GUI slide bar or Pinch In/Out, as shown in FIG. 20B, the CPU 23 executes shift processing for automatically shifting the display area such that the new related image P4 is displayed in the center of the touch screen 18. The CPU 23 enlarges or reduces the display area as shown in FIG. 20A. Such a series of processing is hereinafter referred to as enlarged/reduced image display processing.

Figure 20C:
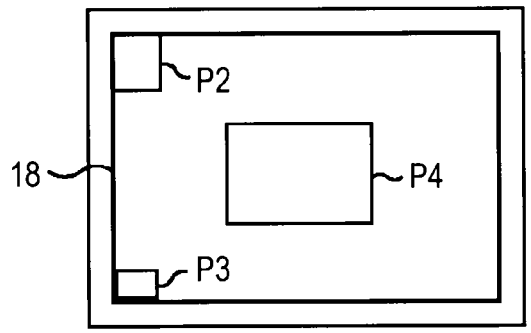
Figure 21:
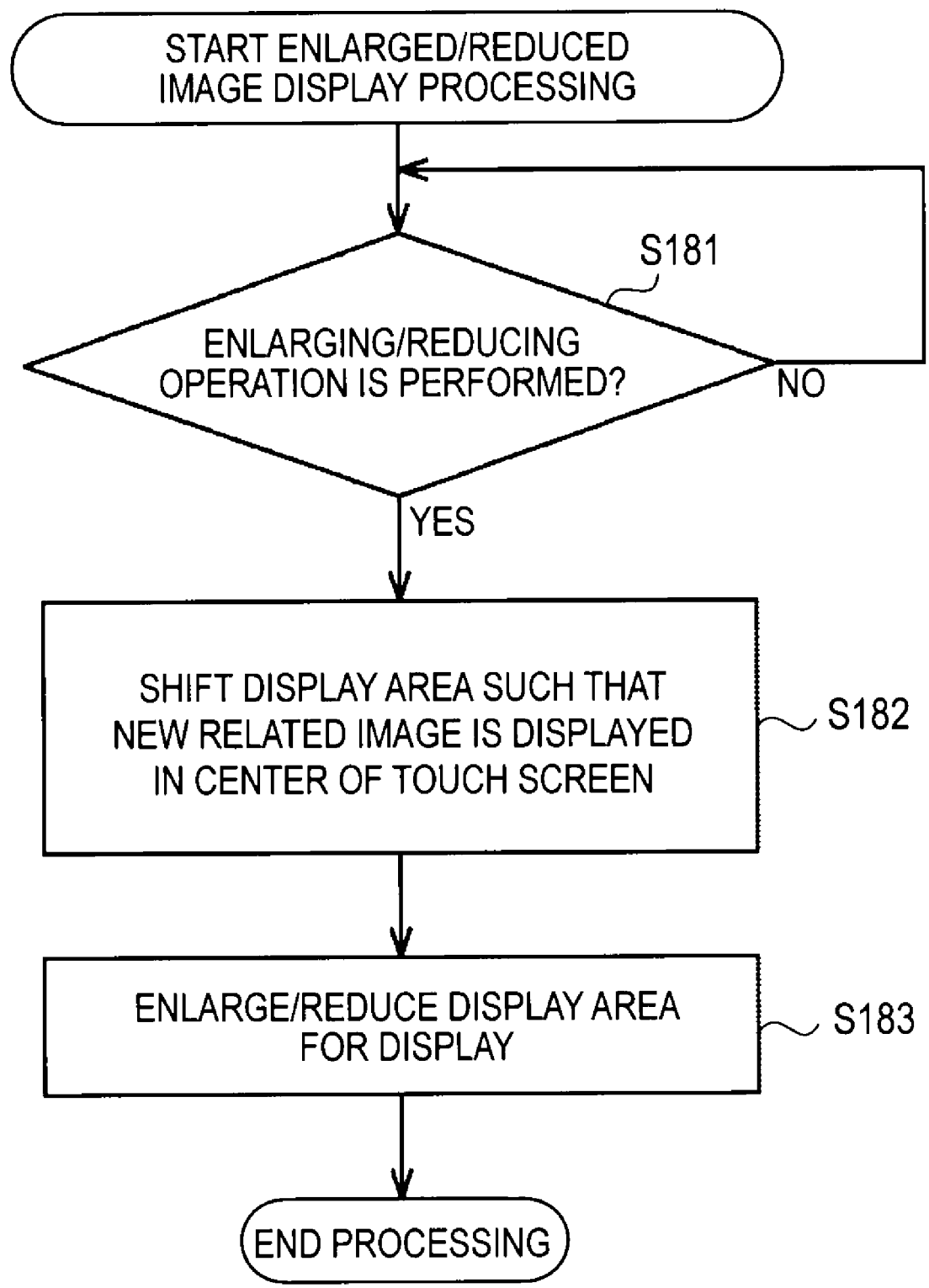
FIG. 21 is a flowchart for explaining an example of the enlarged/reduced image display processing.

FIG. 21 is a flowchart for explaining an example of the enlarged/reduced image display processing explained with reference to FIGS. 20A to 20C.

In step S181, the CPU 23 determines whether enlarging/reducing operation is performed.

When neither the enlarging operation nor the reducing operation is performed, the CPU 23 determines in step S181 that the enlarging/reducing operation is not performed (NO in step S181) and returns the processing to step S181. In other words, until the enlarging operation or the reducing operation is performed, the CPU 23 repeatedly executes the determination processing in step S181.

Thereafter, when the enlarging operation or the reducing operation is performed, the CPU 23 determines in step S181 that the enlarging/reducing operation is performed (YES in step S181) and the processing proceeds to step S182.

In step S182, the CPU 23 controls the digital-signal processing unit 15 to shift the display area such that a new related image is displayed in the center of the touch screen 18. In other words, the new related image is displayed in the center of the touch screen 18. For example, in the example shown in FIGS. 20A to 20C, as shown in FIG. 20B, the related image P4 is displayed in the center of the touch screen 18.

In step S183, the CPU 23 controls the digital-signal processing unit 15 to enlarge or reduce the display area for display. For example, in the example shown in FIGS. 20A to 20C, as shown in FIG. 20C, the display area is enlarged for display.

Consequently, the enlarged/reduced image display processing ends.

By adopting such enlarged/reduced image display processing, it is possible to prevent a deficiency that, when the user performs the enlarging operation, a part of an image that the user most consciously views (a related image) is cut or the image is hidden outside the display area.

For example, the CPU 23 may control the digital-signal processing unit 15 to display a slide bar on the touch screen 18 and, when the slide bar is operated by the user, adjust the display area according to the operation.

For example, the CPU 23 may detect stroking operation by two fingers and adjust the display area according to a direction and a moving distance of the stroking operation.

For example, when the CPU 23 detects contact operation at an arbitrary point on the touch screen 18, the CPU 23 may cause the touch screen 18 to display, as a map, a scattering state of images in an area around a present display area. Further, for example, when the CPU 23 detects the contact operation on the map, the CPU 23 may shift the display area to set a range of the map as a display area.

The series of processing explained above can be executed by hardware or can be executed by software.

In this case, it goes without saying that the series of processing may be executed by the imaging apparatus shown in FIG. 1. Besides, for example, a personal computer shown in FIG. 22 may execute the series of processing.

In FIG. 22, a CPU 101 executes various kinds of processing according to a program recorded in a ROM (Read Only Memory) 102 or a program loaded from a storing unit 108 to a RAM (Random Access Memory) 103. Data and the like necessary when the CPU 101 executes the various kinds of processing are also stored in the RAM 103 as appropriate.

The CPU 101, the ROM 102, and the RAM 103 are connected to one another via a bus 104. An input and output interface 105 is also connected to the bus 104.

An input unit 106 including a keyboard and a mouse, an output unit 107, a storing unit 108 including a hard disk, and a communication unit 109 including a modem and a terminal adapter are connected to the input and output interface 105. The communication unit 109 controls communication performed between the personal computer and another apparatus (not shown) via a network including the Internet.

A drive 110 is also connected to the input and output interface 105 when necessary. A removable medium 111 such as a magnetic disk, an optical disk, a magneto-optical disk, or a semiconductor memory is inserted in the drive 110 as appropriate. A computer program read out from the removable medium 111 is installed in the storing unit 108 when necessary.

When the series of processing is executed by the software, a program forming the software is installed from a network or a recording medium in a computer incorporated in dedicated hardware or a general-purpose personal computer or the like that can execute various functions by installing various programs.

A recording medium including such a program is not limited to the removable medium (a package medium) 111 (FIG. 16) such as a magnetic disk (including a floppy disk), an optical disk (a CD-ROM (Compact Disk-Read Only Memory) and a DVD (Digital Versatile Disk)), a magneto-optical disk (including an MD (Mini-Disk)), or a semiconductor memory that is distributed to provide the user with the program separately from an apparatus main body as shown in FIG. 1 or 22. The recording medium may be a hard disk or the like included in the program ROM 26 shown in FIG. 1 or the ROM 102 or the storing unit 108 shown in FIG. 22 that is provided to the user while being incorporated in an apparatus main body in advance and in which the program is recorded.

In this specification, steps of describing the program recorded in the recording medium include not only processing performed in time series according to order of the steps but also processing in parallel or individually, although not always processed in time series.

The liquid crystal display device such as the liquid crystal display panel 17 is explained above as the display device controlled to display an image by the information processing apparatus according to the embodiment. However, the present invention is applicable to not only the liquid crystal display panel but also a display device explained below. The present invention is applicable to a display device that instructs display for each unit (such a unit is hereinafter referred to as segment) such as a frame or a field forming a moving image and in which plural pixels forming one segment for a predetermined time are formed by display elements and the display of at least a part of the display elements can be held. Such display elements are hereinafter referred to as hold-type display elements. The display device in which a screen is formed by such hold-type display elements is referred to as a hold-type display device. In other words, the liquid crystal display device is only an example of the hold-type display device. The present invention is applicable to the entire hold-type display device.

Further, the present invention is applicable to not only the hold-type display device but also to, for example, a display device of a plane self-emitting type employing an organic EL (Electro Luminescent) device as a light emitting element. The present invention is applicable to an entire display device in which an image is formed by plural pixels and a display element that displays the pixels are included. Such a display device is referred to as a pixel-type display device. In the pixel-type display device, it is not specifically necessary that one display element is associated with one pixel.

In other words, the display device controlled to display an image by the information processing apparatus according to the embodiment only has to be a display device that can execute the series of processing.

The present application contains subject matter related to that disclosed in Japanese Priority Patent Application JP 2008-219119 filed in the Japan Patent Office on Aug. 28, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a display unit configured to display an image;
an operation-input receiving unit configured to receive an operation input of a user; and
a display control unit configured to perform, when the operation-input receiving unit receives a predetermined operation for a root image displayed on the display unit, display control for causing the display unit to display one or more related images related to the root image, wherein the display control unit calculates degrees of relation between all images that could be the root image or one of the related images on the basis of one or more classification items, the display control unit retrieves the one or more related images on the basis of the degrees of relation between the root image and the related images and causes the display unit to display the retrieved one or more related images, and when the operation-input receiving unit receives a contact operation for the root image by a finger of the user, the display control unit analyzes the root image based on a position in the root image where the contact operation is performed, specifies the classification item on the basis of a result of the analysis, and retrieves the one or more related images on the basis of a degree of relation calculated on the basis of the specified classification item.

2. The information processing apparatus according to claim 1, wherein the classification items are determined in advance on the basis of additional information concerning the images.

3. The information processing apparatus according to claim 1, wherein the display control unit retrieves the one or more related images when the display control unit causes the display unit to display the root image.

4. The information processing apparatus according to claim 1, wherein:
an operation by the user of moving a finger in a predetermined direction by a predetermined distance while keeping the finger in contact with the display means is represented as a stroking operation; and
the display control unit causes the display unit to display the related image when the operation-input receiving unit receives the stroking operation.

5. The information processing apparatus according to claim 4, wherein the display control unit causes the display unit to display the related image in a position where the stroking operation ends.

6. The information processing apparatus according to claim 5, wherein:
a predetermined classification item, of the one or more classification items, is associated with one of a plurality of possible directions of the stroking operation, and
the display control unit retrieves the one or more related images on the basis of degrees of relation calculated on the basis of the classification items corresponding to the direction, of the plurality of possible directions, of the stroking operation.

7. The information processing apparatus according to claim 5, wherein the display control unit causes the display unit to sequentially display new related images every time the operation-input receiving unit receives the stroking operation.

8. The information processing apparatus according to claim 5, wherein the display control unit sets, when the operation-input receiving unit receives the stroking operation for the related image, the related image as a new root image and causes the display means to display a new related image related to the new root image.

9. The information processing apparatus according to claim 7, wherein the stroking operation is performed starting from the root image or the related image.

10. The information processing apparatus according to claim 1, wherein the display control unit is further configured to:
when the operation-input receiving unit receives contact operation for the root image by the finger of the user, cause the display unit to display classification item images indicting the respective one or more classification items; and retrieve, when contact operation by the finger of the user for a predetermined one of the one or more classification item images is detected, the one or more related images on the basis of a degree of relation calculated on the basis of the classification item indicated by the classification item image for which the contact operation is performed.

11. The information processing apparatus according to claim 1, further comprising:
a storing unit configured to store history information of the display control by the display control means.

12. The information processing apparatus according to claim 11, wherein the display control unit is further configured to:
cause, when the operation-input receiving unit receives contact operation for the root image or the related image by the finger of the user, the display unit to display the history information stored in the storing unit.

13. The information processing apparatus according to claim 12, wherein the display control unit retrieves, when the operation-input receiving unit receives contact operation by the finger of the user for an image included in the history information, the one or more related images with the image set as the root image and causes the display unit to display the related images.

14. An information processing method comprising:
allowing an information processing apparatus that displays an image and receives operation input of a user to perform, when a predetermined operation for a displayed root image is received, display control for causing a display unit to display one or more related images related to the root image;
calculating, on the basis of one or more classification items, degrees of relation between all images that could be the root image or one of the related images;
receiving the one or more related images out of all the images on the basis of the degrees of relation between the root image and the related images and causing the display means to display the retrieved one or more related images;
analyzing, when a contact operation for the root image is received by a finger of the user, the root image based on a position in the root image where the contact operation is performed;
specifying the classification item on the basis of a result of the analysis of the root image; and
retrieving the one or more related images on the basis of a degree of relation calculated on the basis of the specified classification item.

15. A non-transitory computer readable medium having instructions stored therein for causing a computer that controls an information processing apparatus that displays an image and receives operation input of a user to:
execute, when predetermined operation for a displayed root image is received, display control for causing a display unit to display a related image related to the root image;
calculating, on the basis of one or more classification items, degrees of relation between all images that could be the root image or one of the related images;
receiving the one or more related images out of all the images on the basis of the degrees of relation between the root image and the related images and causing the display means to display the retrieved one or more related images;
analyzing, when a contact operation for the root image is received by a finger of the user, the root image based on a position in the root image where the contact operation is performed;
specifying the classification item on the basis of a result of the analysis of the root image; and
retrieving the one or more related images on the basis of a degree of relation calculated on the basis of the specified classification item.

16. An information processing apparatus comprising:
a display means for displaying an image;
an operation-input receiving means for receiving an operation input of a user; and
a display control means for performing, when the operation-input receiving means receives a predetermined operation for a root image displayed on the display means, display control for causing the display means to display one or more related images related to the root image, wherein
the display control means calculates degrees of relation between all images that could be the root image or one of the related images on the basis of one or more classification items,
the display control means retrieves the one or more related images out on the basis of the degrees of relation between the root image and the related images and causes the display means to display the retrieved one or more related images, and
when the operation-input receiving means receives a contact operation for the root image by a finger of the user, the display control means analyzes the root image based on a position in the root image where the contact operation is performed, specifies the classification item on the basis of a result of the analysis, and retrieves the one or more related images on the basis of a degree of relation calculated on the basis of the specified classification item.

* * * * *